(12) United States Patent
Kim et al.

(10) Patent No.: US 12,002,412 B2
(45) Date of Patent: Jun. 4, 2024

(54) DISPLAY DEVICE

(71) Applicants: SAMSUNG ELECTRONICS CO., LTD., Suwon-si (KR); RESEARCH & BUSINESS FOUNDATION SUNGKYUNKWAN UNIVERSITY, Suwon-si (KR)

(72) Inventors: Jinho Kim, Suwon-si (KR); Yong-Sang Kim, Suwon-si (KR); Donggun Oh, Suwon-si (KR); Jongsu Oh, Suwon-si (KR); Eun Kyo Jung, Suwon-si (KR)

(73) Assignees: SAMSUNG ELECTRONICS CO., LTD., Suwon-si (KR); RESEARCH & BUSINESS FOUNDATION SUNGKYUNKWAN UNIVERSITY, Suwon-si (KR)

( * ) Notice: Subject to any disclaimer, the term of this patent is extended or adjusted under 35 U.S.C. 154(b) by 0 days.

(21) Appl. No.: 18/121,868

(22) Filed: Mar. 15, 2023

(65) Prior Publication Data
US 2023/0222963 A1 Jul. 13, 2023

Related U.S. Application Data

(63) Continuation of application No. PCT/KR2021/010902, filed on Aug. 17, 2021.

(30) Foreign Application Priority Data

Oct. 5, 2020 (KR) ........................ 10-2020-0128351

(51) Int. Cl.
G09G 3/32 (2016.01)

(52) U.S. Cl.
CPC ....... *G09G 3/32* (2013.01); *G09G 2300/0426* (2013.01); *G09G 2310/061* (2013.01);
(Continued)

(58) Field of Classification Search
None
See application file for complete search history.

(56) References Cited

U.S. PATENT DOCUMENTS 7,167,169 B2   1/2007   Libsch et al.
7,808,497 B2   10/2010  Lo et al.
(Continued)

FOREIGN PATENT DOCUMENTS

EP    4018431 A1    6/2022
JP    2008-304908 A  12/2008
(Continued)

OTHER PUBLICATIONS

International Search Report (PCT/ISA/210) issued by the International Searching Authority on Nov. 23, 2021 in International Application No. PCT/KR2021/010902.
(Continued)

*Primary Examiner* — Parul H Gupta
(74) *Attorney, Agent, or Firm* — Sughrue Mion, PLLC

(57) ABSTRACT

A display device includes a display panel including a pixel array including a plurality of pixels and a plurality of sub-pixel circuits, each pixel of the plurality of pixels including a plurality of inorganic light emitting elements and a sub-pixel circuit of the plurality of sub-pixel circuits being provided for an inorganic light emitting element of the plurality of inorganic light emitting elements, a driver configured to set the image data voltage to sub-pixel circuits included in each of the plurality of row lines in an order of the row lines, a sensing unit configured to sense a current flowing in a driving transistor included in the sub-pixel circuit based on a specific voltage applied to the sub-pixel circuit, and output sensing data corresponding to the sensed
(Continued)

current, and a correction unit configured to correct the image data voltage applied to the sub-pixel circuit based on the sensing data.

19 Claims, 27 Drawing Sheets

(52) U.S. Cl.
CPC . *G09G 2310/08* (2013.01); *G09G 2320/0233* (2013.01); *G09G 2320/064* (2013.01)

(56) References Cited

U.S. PATENT DOCUMENTS

| | | | |
|---|---|---|---|
| 8,022,907 B2 | 9/2011 | Park et al. | |
| 10,706,766 B2 | 7/2020 | Kim et al. | |
| 10,825,380 B2 | 11/2020 | Kim et al. | |
| 10,916,206 B2 | 2/2021 | Jung et al. | |
| 11,056,047 B2 | 7/2021 | Shigeta et al. | |
| 11,201,202 B2 | 12/2021 | Kim et al. | |
| 2006/0220578 A1 | 10/2006 | Park et al. | |
| 2007/0152934 A1* | 7/2007 | Maeda | G09G 3/3233 345/92 |
| 2011/0084993 A1 | 4/2011 | Kawabe | |
| 2013/0083000 A1* | 4/2013 | Toyomura | G09G 3/3233 345/212 |
| 2014/0320465 A1 | 10/2014 | Oh et al. | |
| 2017/0263183 A1 | 9/2017 | Lin et al. | |
| 2018/0114815 A1* | 4/2018 | Lee | H05B 33/02 |
| 2018/0182279 A1* | 6/2018 | Sakariya | G09G 3/2088 |
| 2018/0336823 A1* | 11/2018 | Lin | G09G 3/3258 |
| 2019/0206337 A1 | 7/2019 | Jung et al. | |
| 2019/0371231 A1 | 12/2019 | Kim et al. | |
| 2020/0161405 A1 | 5/2020 | Kim et al. | |
| 2020/0265777 A1 | 8/2020 | Shigeta et al. | |
| 2021/0049957 A1 | 2/2021 | Lee | |
| 2021/0210002 A1* | 7/2021 | Kim | G09G 3/2014 |
| 2021/0304670 A1 | 9/2021 | Shigeta et al. | |
| 2022/0069061 A1 | 3/2022 | Kim et al. | |

FOREIGN PATENT DOCUMENTS

| | | |
|---|---|---|
| KR | 10-0629586 B1 | 9/2006 |
| KR | 10-2014-0129622 A | 11/2014 |
| KR | 10-1503823 B1 | 3/2015 |
| KR | 10-2018-0095773 A | 8/2018 |
| KR | 10-2019-0082565 A | 7/2019 |
| KR | 10-2019-0136882 A | 12/2019 |
| KR | 10-2020-0036781 A | 4/2020 |
| KR | 10-2020-0057198 A | 5/2020 |
| KR | 10-2131266 B1 | 7/2020 |
| KR | 10-2020-0101605 A | 8/2020 |
| WO | 2021137664 A1 | 7/2021 |

OTHER PUBLICATIONS

Written Opinion (PCT/ISA/237) issued by the International Searching Authority on Nov. 23, 2021 in International Application No. PCT/KR2021/010902.
Communication dated Sep. 18, 2023 issued by the European Patent Office in European Patent Application No. 21877827.2.

* cited by examiner

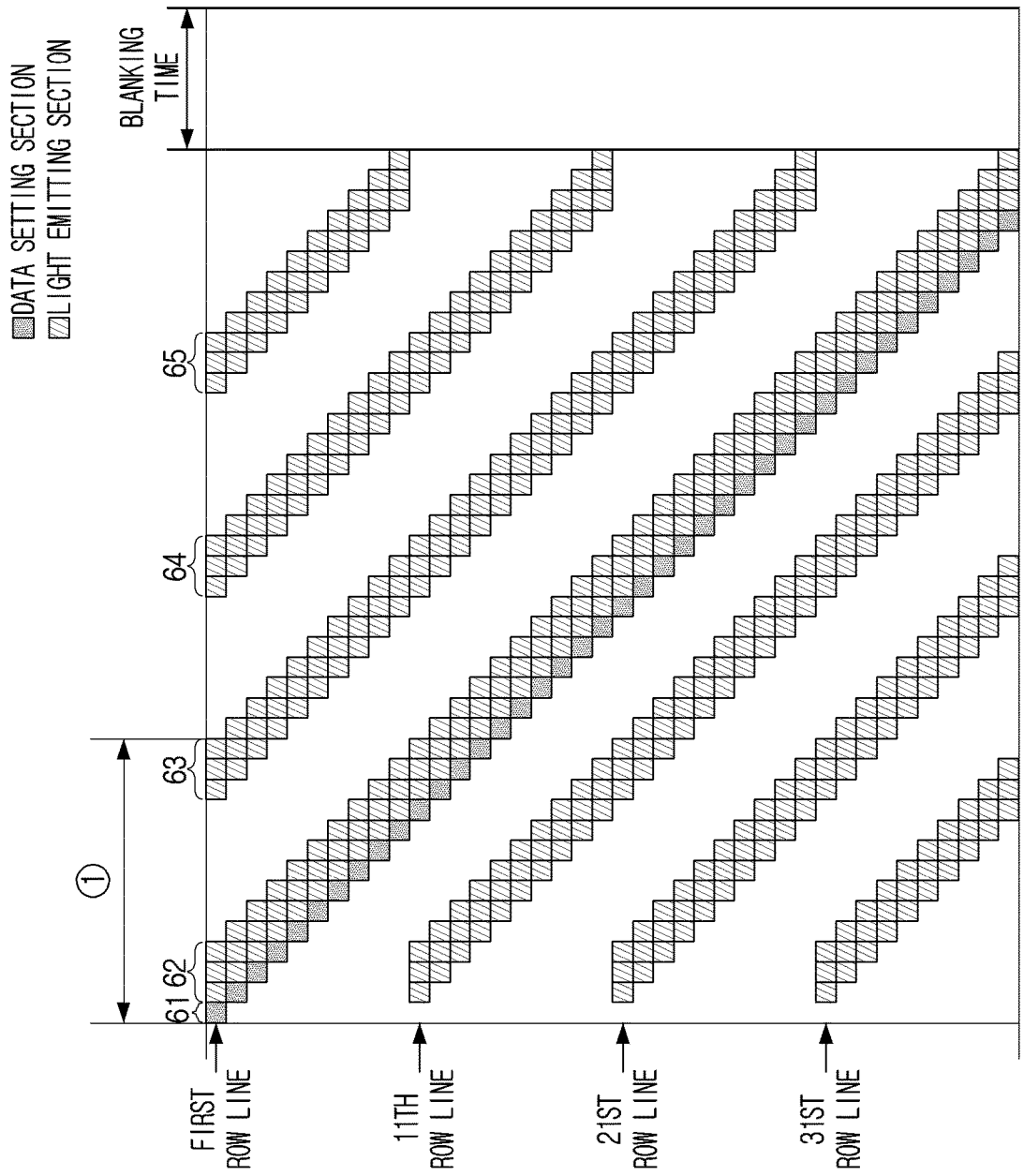

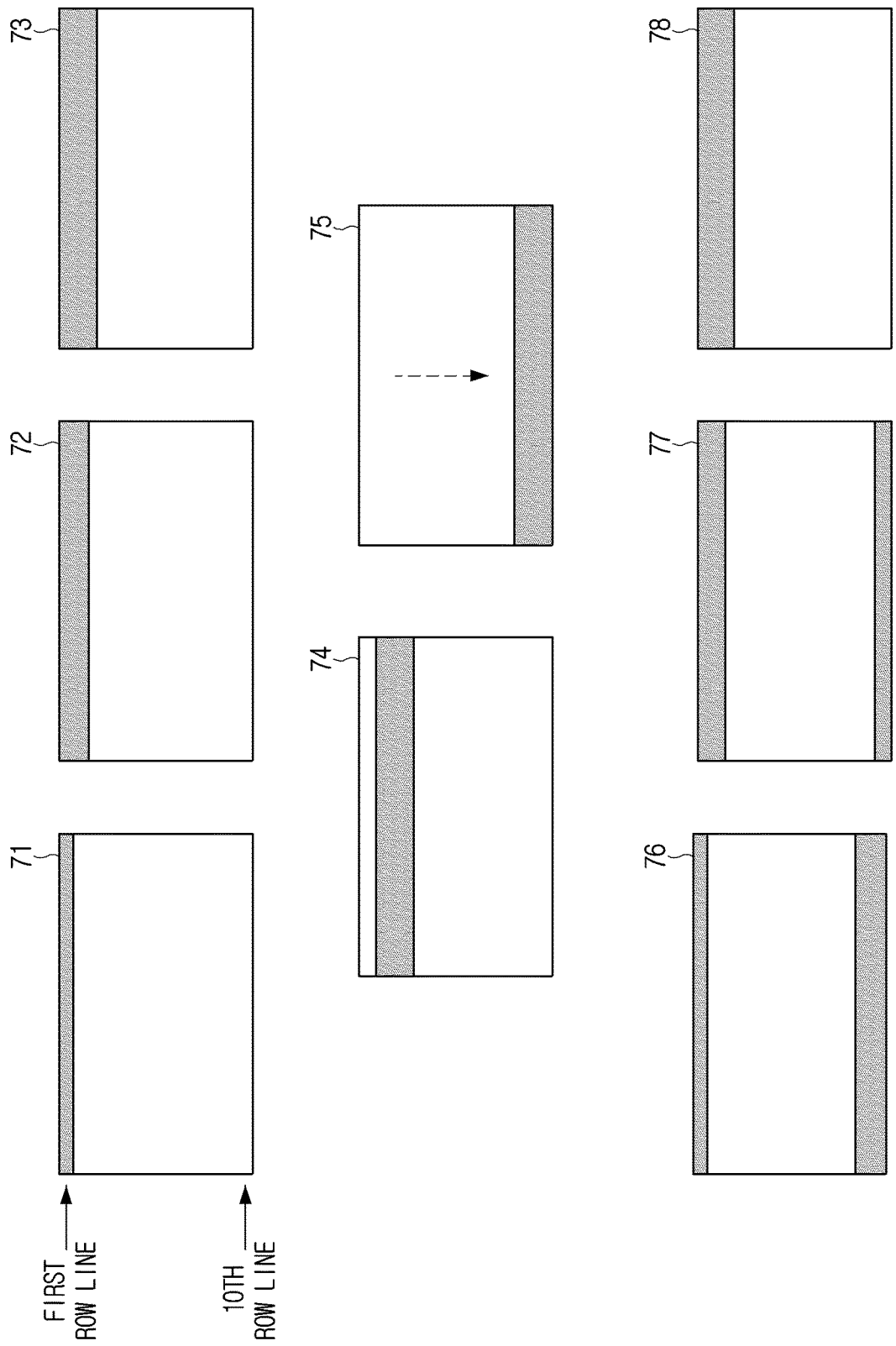

DISPLAY DEVICE

CROSS-REFERENCE TO RELATED APPLICATION(S)

This application is a bypass continuation of International Application No. PCT/KR2021/010902, filed on Aug. 17, 2021, which is based on and claims priority to Korean Patent Application No. 10-2020-0128351, filed on Oct. 5, 2020, in the Korean Intellectual Property Office, the disclosures of which are incorporated by reference herein in their entireties.

BACKGROUND

1. Field

The disclosure relates to a display device, and more particularly, to a display device including a pixel array having light emitting elements.

2. Description of Related Art

In the related art, in a display device in which inorganic light emitting elements such as a red light-emitting diode (LED), a green LED, and a blue LED (hereinafter, an LED refers to an inorganic light emitting element) are driven as sub-pixels, a gray scale of a sub-pixel is represented by a pulse amplitude modulation (PAM) driving method.

In this case, depending on a magnitude of a driving current, a wavelength as well as a gray scale of emitted light may change, resulting in decrease in color reproducibility of an image. FIG. 1 illustrates a wavelength change according to the magnitude of a driving current flowing through a blue LED, a green LED, and a red LED.

Each sub-pixel is driven through a sub-pixel circuit including a driving transistor in the display device. Here, differences may exist in a threshold voltage Vth or mobility µ of a driving transistor for each driving transistor. This may cause degradation of brightness uniformity of the display device, which becomes a problem.

Provided are a display device providing improved color reproducibility for an input image signal, and a driving method thereof.

In addition, provided are a display device that is constituted to include sub-pixel circuits that are capable of driving inorganic light emitting elements more effectively and stably, and a driving method thereof.

Further, provided are a display device including a driving circuit appropriate for high density integration by optimizing design of various kinds of circuits driving inorganic light emitting elements, and a driving method thereof.

SUMMARY

According to an aspect of the disclosure, a display device includes: a display panel including a pixel array including a plurality of pixels and a plurality of sub-pixel circuits, wherein the plurality of pixels are arranged in a plurality of row lines, each pixel of the plurality of pixels includes a plurality of inorganic light emitting elements a sub-pixel circuit of the plurality of sub-pixel circuits is provided for each inorganic light emitting element of the plurality of inorganic light emitting elements and is configured to drive the inorganic light emitting element based on an image data voltage, and each sub-pixel circuit of the plurality of sub-pixel circuits includes a driving transistor; a driver configured to set the image data voltage to sub-pixel circuits in each row line of the plurality of row lines in an order of the row lines, and drive sub-pixel circuits in some of continued row lines among the plurality of row lines so that inorganic light emitting elements in some of the continued row lines emit light in the order of the row lines based on the set image data voltage; a sensing unit configured to sense a current flowing in the driving transistor of each sub-pixel circuit based on a specific voltage applied to the sub-pixel circuit, and output sensing data corresponding to the sensed current; and a correction unit configured to correct the image data voltage applied to the sub-pixel circuit based on the sensing data.

The driver may be further configured to during a data setting section for each of the row lines, set the image data voltage to the sub-pixel circuits in each row line of the plurality of row lines, and drive the sub-pixel circuits in each row line of the plurality of row lines so that inorganic light emitting elements in at least two continued row lines of the continued row lines emit light based on the set image data voltage in a plurality of light emitting sections for each row line of the plurality of row lines.

A first light emitting section among the plurality of light emitting sections may be temporally continuous with the data setting section, and each of the plurality of light emitting sections has a preset time interval.

The plurality of row lines may be divided into a plurality of groups, each of the plurality of groups including a number of continued row lines, the driver may be further configured to: during a first image frame section, set a first image data voltage to the sub-pixel circuits in each row line of the plurality of row lines in the order of the row lines from a first row line to a last row line of the plurality of row lines, and during the first image frame section, drive the display panel so that inorganic light emitting elements in one group among the plurality of groups emit light in the order of the row lines, and then inorganic light emitting elements in each of at least two continued groups among the plurality of groups emit light in the order of the row lines based on the set first image data voltage, and the at least two continued groups include the one group.

The driver may be further configured to: during a second image frame section before the first image frame section, set a second image data voltage to the sub-pixel circuits in each row line of the plurality of row lines from the first row line to the last row line of the plurality of row lines in the order of the row lines, and during the first image frame section, drive the display panel so that inorganic light emitting elements in each of the remaining groups of the plurality of groups excluding at least one group driven based on the first image data voltage emit light in the order of the row lines based on the second image data voltage.

The driver may be further configured to, during the first image frame section, drive the display panel so that inorganic light emitting elements in each row line of each of the plurality of groups emit light a plurality of times based on at least one of the first image data voltage or the second image data voltage in the plurality of light emitting sections for each row line of the plurality of row lines.

The image data voltage may include a constant current generator data voltage and a pulse width modulation (PWM) data voltage, and each of the plurality of sub-pixel circuits may include: a constant current generator circuit including a first driving transistor and configured to control a size of a driving current provided to the inorganic light emitting element based on the constant current generator data voltage; and a PWM circuit including a second driving transistor and configured to control a driving time of the driving current based on the PWM data voltage.

Each of the plurality of sub-pixel circuits may further include a first transistor, wherein a gate terminal of the first transistor is connected with the second driving transistor, and a source terminal or drain terminal of the first transistor is connected with the first driving transistor, and the constant current generator circuit may be further configured to, based on the first transistor being turned on, provide the driving current having a size corresponding to the constant current generator data voltage flowing through the first driving transistor to the inorganic light emitting element, and the PWM circuit may be further configured to, based on the PWM data voltage being set to a gate terminal of the second driving transistor, turn off the first transistor based on the second driving transistor being turned on as a voltage of the gate terminal of the second driving transistor changes according to a sweep voltage.

The PWM circuit further may include a reset unit configured to turn on the first transistor before a start of each light emitting section.

The first driving transistor, the second driving transistor, and the first transistor may be PMOSFETs, the gate terminal of the first transistor may be connected to a drain terminal of the second driving transistor, and the source terminal of the first transistor is connected to a drain terminal of the first driving transistor, and an anode terminal of the inorganic light emitting element may be connected to the drain terminal of the first transistor, and a cathode terminal of the first transistor is connected to a ground voltage terminal.

The first driving transistor, the second driving transistor, and the first transistor may be PMOSFETs, the gate terminal of the first transistor may be connected to a drain terminal of the second driving transistor, and the source terminal of the first transistor is connected to a drain terminal of the first driving transistor, an anode terminal of the inorganic light emitting element may be connected to a driving voltage terminal, and a cathode terminal of the inorganic light emitting element is connected to the source terminal of the first driving transistor, and each of the plurality of sub-pixel circuits may further include a second transistor that is connected to the inorganic light emitting element in parallel, and is turned on during the data setting section and is turned off in each of the plurality of light emitting sections.

The first driving transistor, the second driving transistor, and the first transistor may be NMOSFETs, the gate terminal of the first transistor may be connected to a source terminal of the second driving transistor, and the drain terminal of the first transistor is connected to a source terminal of the first driving transistor, and an anode terminal of the inorganic light emitting element may be connected to a driving voltage terminal, and a cathode terminal of the inorganic light emitting element is connected to the drain terminal of the first driving transistor.

The constant current generator data voltage and the pulse width modulation (PWM) data voltage may be applied to the constant current generator circuit and the PWM circuit, respectively, through separate data lines.

The specific voltage may include a first specific voltage applied to the constant current generator circuit and a second specific voltage applied to the PWM circuit, and the sensing unit may be further configured to: sense a first current flowing in the first driving transistor based on the first specific voltage, and output first sensing data corresponding to the sensed first current, and sense a second current flowing in the second driving transistor based on the second specific voltage, and output second sensing data corresponding to the sensed second current.

Each of the plurality of sub-pixel circuits may further include: a third transistor configured to transmit the first current to the sensing unit; and a fourth transistor configured to transmit the second current to the sensing unit, and each of the plurality of sub-pixel circuits is configured to: provide the first current to the sensing unit through the third transistor while the first specific voltage is applied to the constant current generator circuit, and provide the second current to the sensing unit through the fourth transistor while the second specific voltage is applied to the PWM circuit.

The correction unit may be further configured to: correct the constant current generator data voltage based on the first sensing data, and correct the PWM data voltage based on the second sensing data.

The correction unit may be further configured to: obtain a first compensation value for correcting the constant current generator data voltage and a second compensation value for correcting the PWM data voltage based on a look-up table including sensing data values, and correct the constant current generator data voltage and the PWM data voltage based on the obtained first compensation value and the obtained second compensation value, respectively.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 5B is a diagram illustrating the second frame illustrated in FIG. 5A in more detail;

FIG. 5C is a diagram illustrating a light emitting operation of a display panel according to an embodiment of the disclosure;

DETAILED DESCRIPTION

In describing the disclosure, detailed descriptions of related known technologies will be omitted when it is determined that the descriptions may unnecessarily obscure the gist of the disclosure. In addition, overlapping descriptions of the same components will be omitted as far as possible.

The suffix "unit" for components used in the following description is added or interchangeably used only in consideration of the convenience in drafting the specification, and it does not have a distinguished meaning or role by itself.

The terminology used in the disclosure is used to describe embodiments, and is not intended to restrict and/or limit the disclosure. Further, a singular expression of any component used in the disclosure includes a plural expression, except for a case obviously meaning the contrary in the context.

It is to be understood that in the disclosure, terms such as 'include' or 'have' may be used to designate a presence of a characteristic, a number, a step, an operation, an element, a component, or a combination thereof described in the specification, and not to preclude a presence or a possibility of adding one or more of other characteristics, numbers, steps, operations, elements, components or a combination thereof.

In the disclosure, expressions such as "first", "second", etc. may be used to describe various elements regardless of their order and/or importance, and just to discriminate one element from other elements, but are not used to limit the elements.

In the disclosure, if it is described that a certain element (e.g., a first element) is "(operatively or communicatively) coupled with/to" or "connected to" another element (e.g., a second element), it should be understood that the certain element may be directly connected to the another element, or may be connected to the another element through still another element (e.g., a third element).

On the other hand, if it is described that a certain element is "directly coupled with/to" or "directly connected to" another certain element (e.g., another first element (e.g., a second element)), it may be understood that there is no another element (e.g., a third element) between the certain element and the another certain element.

The terms used in the embodiments of the disclosure may be interpreted in a meaning commonly known to those of ordinary skill in the art unless otherwise defined.

Hereinafter, various embodiments of the disclosure will be described in detail with reference to the accompanying drawings.

Figure 1:
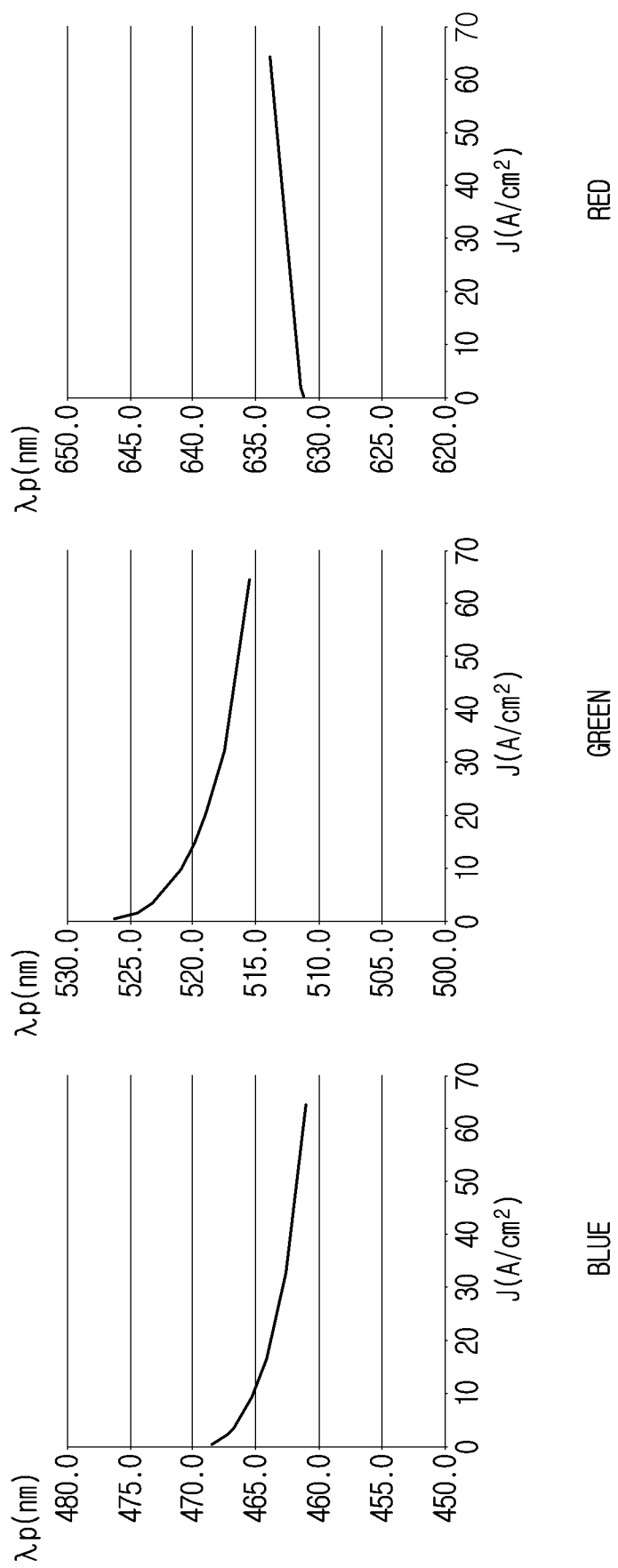
FIG. 1 is a graph illustrating a wavelength change according to the magnitude of a driving current flowing in a blue LED, a green LED, and a red LED.
Figure 2:
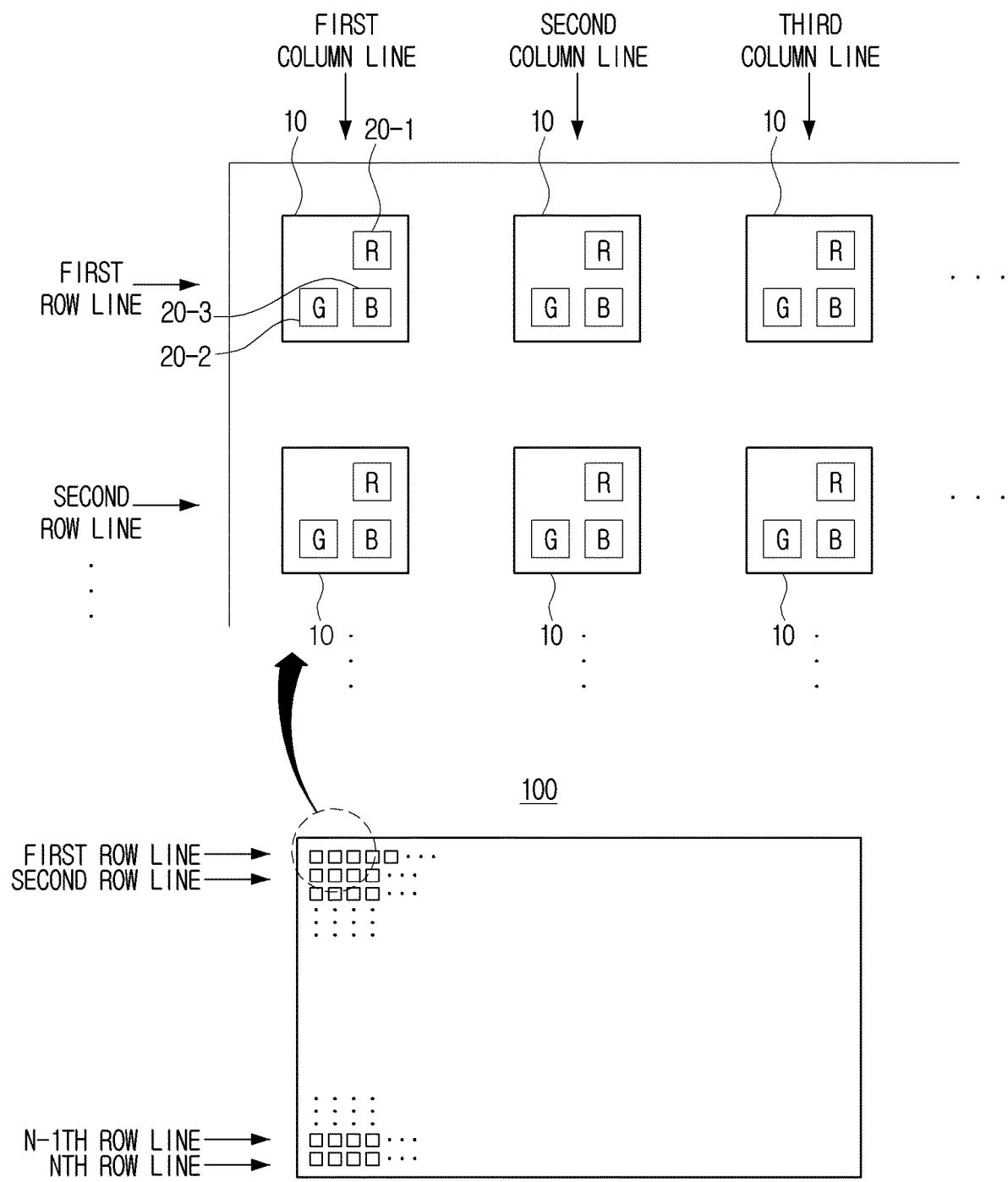
FIG. 2 is a diagram for illustrating a pixel structure of a display device according to an embodiment of the disclosure.

FIG. 2 is a diagram for illustrating a pixel structure of a display panel according to an embodiment of the disclosure.

Referring to FIG. 2, the display panel 100 includes a plurality of pixels 10 disposed or arranged in a matrix form, i.e., a pixel array.

The pixel array includes a plurality of row lines or a plurality of column lines. Depending on cases, the row line may also be called a horizontal line, a scan line, or a gate line, and the column line may also be called a vertical line or a data line.

Alternatively, terms such as a row line, a column line, a horizontal line, and a vertical line may be used as words to refer to a line on the pixel array, and terms such as a scan line, a gate line, and a data line may be used as words to refer to an actual line on the display panel 100 to which data or signals are transmitted.

Each pixel 10 of the pixel array may include three types of sub-pixels such as a red (R) sub-pixel 20-1, a green (G) sub-pixel 20-2, and a blue (B) sub-pixel 20-3.

Here, each pixel 10 may include a plurality of inorganic light emitting elements constituting the sub-pixels 20-1, 20-2, and 20-3 of the pixel.

For example, each pixel 10 may include three types of inorganic light emitting elements, such as an R inorganic light emitting element corresponding to the R sub-pixel 20-1, a G inorganic light emitting element corresponding to the G sub-pixel 20-2, and a B inorganic light emitting element corresponding to the B sub-pixel 20-3.

Alternatively, each pixel 10 may include three blue inorganic light emitting elements. In this case, a color filter for implementing R, G, or B color may be provided on each inorganic light emitting element. Here, the color filter may be a quantum dot (QD) color filter, but is not limited thereto.

On each sub-pixel 20-1, 20-2, 20-3, a sub-pixel circuit for controlling the light emitting time of the inorganic light emitting element constituting the sub-pixel may be provided.

Here, each sub-pixel circuit may represent a gray scale of each sub-pixel by driving the corresponding inorganic light emitting element based on an applied image data voltage. Here, the image data voltage includes a constant current generator data voltage and a pulse width modulation (PWM) data voltage, and in particular, according to an embodiment of the disclosure, each sub-pixel may represent a gray scale of an image by controlling the light emitting time of the inorganic light emitting element based on a PWM data voltage. A detailed content in this regard will be described later.

According to an embodiment of the disclosure, sub-pixels included in each row line of the display panel 100 may be driven in the order of "setting (or programming) an image data voltage" and "light emission based on the set image data voltage." Also, in sub-pixels included in some of the continued row lines among the entire row lines of the display panel 100, the aforementioned operations of setting an image data voltage and light emission may proceed in the order of the row lines.

For example, the operations of setting an image data voltage and light emission of sub-pixels included in one row line (e.g., a first row line), and the operations of setting an image data voltage and light emission of sub-pixels included in the next row line (e.g., a second row line) may proceed sequentially in the order of the row lines.

Here, the feature of sequentially proceeding in the order of the row lines does not mean that operations related to the next row line should start after all operations related to one row line are completed. That is, in the above example, an image data voltage may be set to sub-pixels included in the second row line after an image data voltage is set to sub-pixels included in the first row line in a temporal sense, and it is not meant that a PWM data voltage should necessarily be set to the sub-pixels included in the second row line after a light emitting operation of the sub-pixels included in the first row line is completed.

Figure 3A:
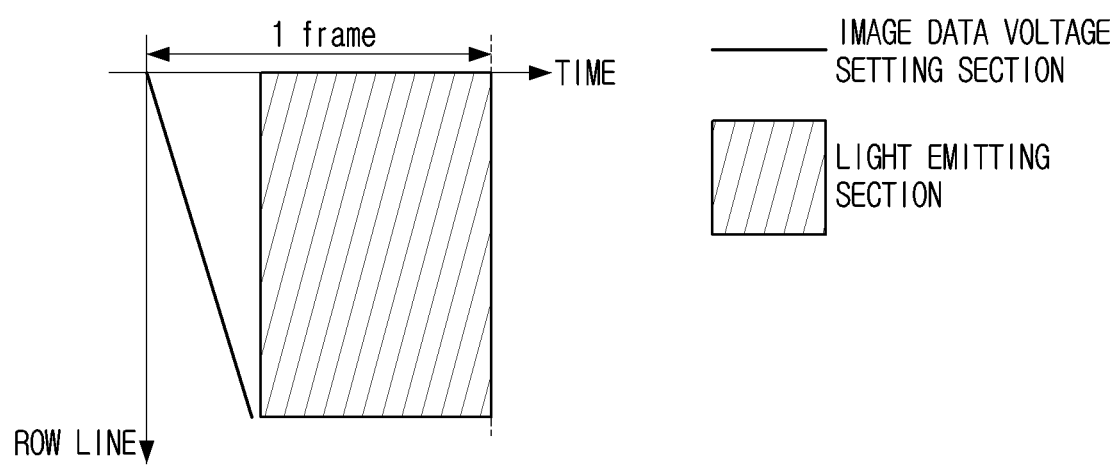
FIG. 3A is a conceptual diagram illustrating a driving method of a conventional display panel.
Figure 3B:
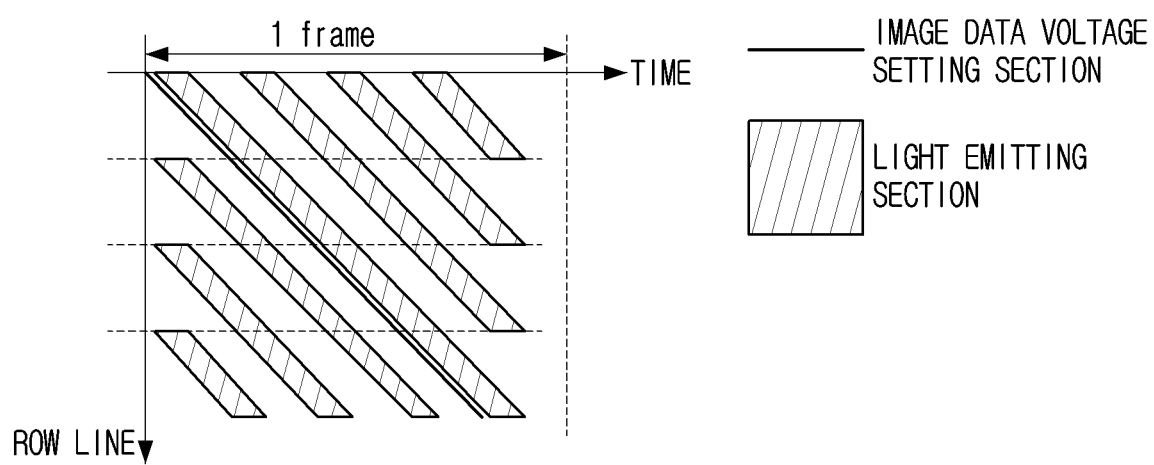
FIG. 3B is a conceptual diagram illustrating a driving method of a display panel according to an embodiment of the disclosure.

FIG. 3A is a conceptual diagram illustrating a driving method of a display panel in the related art, and FIG. 3B is a conceptual diagram illustrating a driving method of a display panel according to an embodiment of the disclosure. FIG. 3A and FIG. 3B illustrate various methods of driving a display panel during one image frame time.

In FIG. 3A and FIG. 3B, the vertical axis represents a row line, and the horizontal axis represents time. Also, the data setting section represents a driving period of the display panel 100 in which an image data voltage is set to the sub-pixels included in each row line, and the light emitting section represents a driving period of the display panel 100 in which the sub-pixels emit light according to the image data voltage in the section.

According to FIG. 3A, it can be known that in the related art, after the settings of image data voltages for the entire row lines of the display panel are completed first, the light emitting sections collectively proceed at once.

In this case, the entire row lines of the display panel emit light simultaneously during the light emitting sections, and thus a high peak current is required, and accordingly, there is a problem that peak power consumption required for a product increases. When peak power consumption increases, a capacity of a power supply device such as a switched mode power supply (SMPS) installed in a product increases, resulting in an increase in the cost and the volume, which causes restrictions in the design.

On the contrary, according to an embodiment of the disclosure, it can be known that an image data voltage setting section and a light emitting section of each row line proceed sequentially in the order of the row lines, as illustrated in FIG. 3B. In the case of driving the light emitting sections for each row line sequentially in the order of the row lines as above, the number of the row lines that emit light simultaneously decreases, and thus the necessary peak current amount decreases compared to the related art, and accordingly, the peak power consumption can be reduced.

As described above, according to the various embodiments of the disclosure, by driving an inorganic light emitting element by PWM driving in an active matrix (AM) manner, a phenomenon in which the wavelength of light emitted from the inorganic light emitting element changes according to a gray scale can be prevented. Also, by driving the display panel 100 so that the sub-pixels proceed with light emission sequentially in the order of the row lines, instantaneous peak power consumption can be reduced.

In FIG. 2, an example in which the sub-pixels 20-1 to 20-3 are arranged in a shape of L of which left and right sides are inverted within one pixel region is suggested. However, embodiments are not limited thereto, and the R, G, and B sub-pixels 20-1 to 20-3 may be arranged in a line inside a pixel region, and may be arranged in various shapes depending on embodiments.

Also, in FIG. 2, description was made based on an example in which three types of sub-pixels constitute one pixel. However, depending on embodiments, four types of sub-pixels such as R, G, B, and white (W) may constitute one pixel, and any other number of sub-pixels may constitute one pixel.

Figure 4:
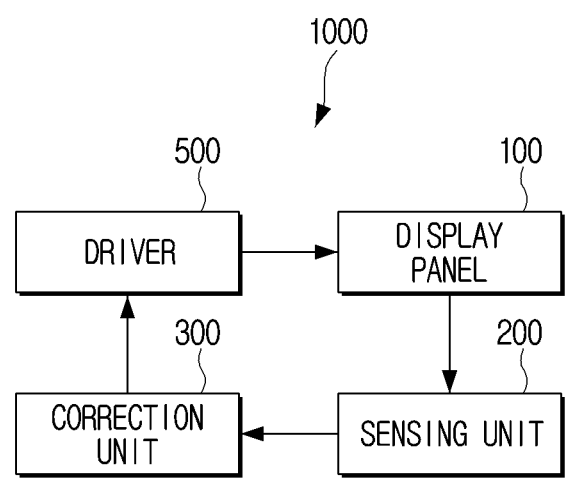
FIG. 4 is a block diagram illustrating a configuration of a display module according to an embodiment of the disclosure.

FIG. 4 is a block diagram illustrating a configuration of a display device according to an embodiment of the disclosure. According to FIG. 4, the display device 1000 includes a display panel 100, a sensing unit (or sensing circuit) 200, a correction unit 300, and a driver 500.

The driver 500 drives the display panel 100. Specifically, the driver 500 may provide various kinds of control signals, data signals, power signals, or the like, to the display panel 100 to drive the display panel 100.

As described above, according to an embodiment of the disclosure, the display panel 100 may be driven in the order of the row lines. Thus, for this, the driver 500 may include at least one gate driver circuit (or a scan driver circuit) for providing a control signal for driving pixels on the pixel array in units of row lines.

Also, the driver 500 may include a source driver circuit (or a data driver circuit) for providing an image data voltage and a specific voltage to be described below to each pixel (or each sub-pixel) on the pixel array.

The driver 500 may include a DeMUX circuit for selecting each of the plurality of sub-pixels 20-1 to 20-3 constituting the pixel 10.

Also, the driver 500 may include a driving voltage supply circuit for supplying various kinds of driving voltages (e.g., a first driving voltage, a second driving voltage, a ground voltage, a test voltage, a Vset voltage, etc. to be described below) to each sub-pixel circuit included in the display panel 100.

In addition, the driver 500 may include a clock signal supply circuit supplying various kinds of clock signals for driving a gate driver or data driver circuit, and include a sweep voltage supply circuit for supplying a sweep voltage to be described below.

According to an embodiment of the disclosure, at least some of the aforementioned various kinds of circuits of the driver 500 may be implemented in the form of a separate chip and mounted on an external printed circuit board (PCB) together with a timing controller (TCON), and may be connected with sub-pixel circuits formed on a TFT layer of the display panel 100 through a film on glass (FOG) wiring.

Alternatively, at least some of the aforementioned various kinds of circuits of the driver 500 may be implemented in the form of a separate chip and arranged on a film in the form of a chip on film (COF), and may be connected with the sub-pixel circuits formed on the TFT layer of the display panel 100 through the film on glass (FOG) wiring.

Alternatively, at least some of the aforementioned various kinds of circuits of the driver 500 may be implemented in the form of a separate chip and arranged in the form of a chip on glass (COG) (i.e., arranged on a rear surface of a glass substrate (to be described below) (a surface on the opposite side of a surface on which the TFT layer is formed with respect to the glass substrate) of the display panel 100), and may be connected with the sub-pixel circuits formed on the TFT layer of the display panel 100 through a connection wiring.

Alternatively, at least some of the aforementioned various kinds of circuits of the driver 500 may be formed on the TFT layer together with the sub-pixel circuits formed on the TFT layer inside the display panel 100, and may be connected with the sub-pixel circuits.

For example, among the aforementioned various kinds of circuits of the driver 500, the gate driver circuit, the sweep voltage supply circuit, and the DeMUX circuit may be formed in the TFT layer of the display panel 100, and the data driver circuit may be arranged on the rear surface of the glass substrate of the display panel 100, and the driving voltage supply circuit, the clock signal supply circuit, and the timing controller (TCON) may be arranged on the external printed circuit board (PCB), but the disclosure is not limited thereto.

In particular, according to an embodiment of the disclosure, the driver 500 may set an image data voltage to the sub-pixels included in each row line of the display panel 100 in the order of the row lines, and drive the display panel 100 so that the sub-pixels included in some of the continued row lines among the plurality of row lines emit light in the order of the row lines based on the set image data voltage.

Here, some of the continued row lines refer to the continued row lines of each group when the entire row lines of the display panel 100 are divided into a plurality of groups including some continued row lines.

Accordingly, the driver 500 may drive the display panel 100 so that the sub-pixels included in the row lines belonging to each group emit light in the order of the row lines, for each group of the row lines including continued row lines, as illustrated in FIG. 3B.

The display panel 100 may include a pixel array as described above in FIG. 2, and display an image corresponding to an applied image data voltage.

Each pixel circuit included in the display panel 100 may provide a driving current of which magnitude and driving time or pulse width are controlled to a corresponding inorganic light emitting element based on an applied image data voltage. Accordingly, the inorganic light emitting element may emit light according to the magnitude and the driving time of the provided driving current, and the display panel 100 may display an image corresponding to the applied image data voltage.

The sub-pixel circuits providing a driving current to the inorganic light emitting elements include driving transistors. The driving transistors are core components that determine operations of the sub-pixel circuits, and theoretically, electronic characteristics such as threshold voltages Vth or mobility µ of the driving transistors should be identical among the sub-pixel circuits of the display panel 100. However, in practice, there may be deviations in the threshold voltages Vth and the mobility µ of the driving transistors among the respective sub-pixel circuits due to various factors such as process deviations or changes over time. These deviations cause degradation of image quality of an image, and thus need to be compensated.

In the various embodiments of the disclosure, the aforementioned deviations are compensated through an external compensation method. An external compensation method is a method of sensing a current flowing in driving transistors, and correcting an image data voltage based on the sensing result, and thereby compensating deviations in the threshold voltages Vth and the mobility µ of the driving transistors among sub-pixel circuits.

The sensing unit 200 is a component for sensing a current flowing in a driving transistor included in a pixel circuit, and outputting sensing data corresponding to the sensed current.

Specifically, if a current based on a specific voltage flows in a driving transistor, the sensing unit 200 may convert the current flowing in the driving transistor into sensing data, and output the converted sensing data to the correction unit 300. Here, the specific voltage refers to a voltage that is applied to a sub-pixel circuit separately from an image data voltage for sensing a current flowing in a driving transistor included in the pixel circuit.

The correction unit 300 is a component for correcting image data voltages applied to sub-pixel circuits based on sensing data and may be a processor or circuit.

Specifically, the correction unit 300 may acquire a compensation value for correcting image data based on a look-up table including sensing data values for each voltage and sensing data output from the sensing unit 200.

Here, the look-up table including sensing data values for each voltage may be stored in advance in various kinds of memories inside or outside the correction unit 300, and the correction unit 300 may load the look-up table from the memories when necessary, and use the look-up table.

Also, the correction unit 300 may correct the image data based on the acquired compensation value, and thereby correct image data voltages applied to the sub-pixel circuits.

Accordingly, deviations in the threshold voltages Vth and the mobility Ξ of the driving transistors among the sub-pixel circuits may be compensated.

Hereinafter, the driving method of driving the display panel 100 in the order of the row lines as illustrated in FIG. 3B will be described in more detail with reference to FIG. 5A to FIG. 5E.

Figure 5A:
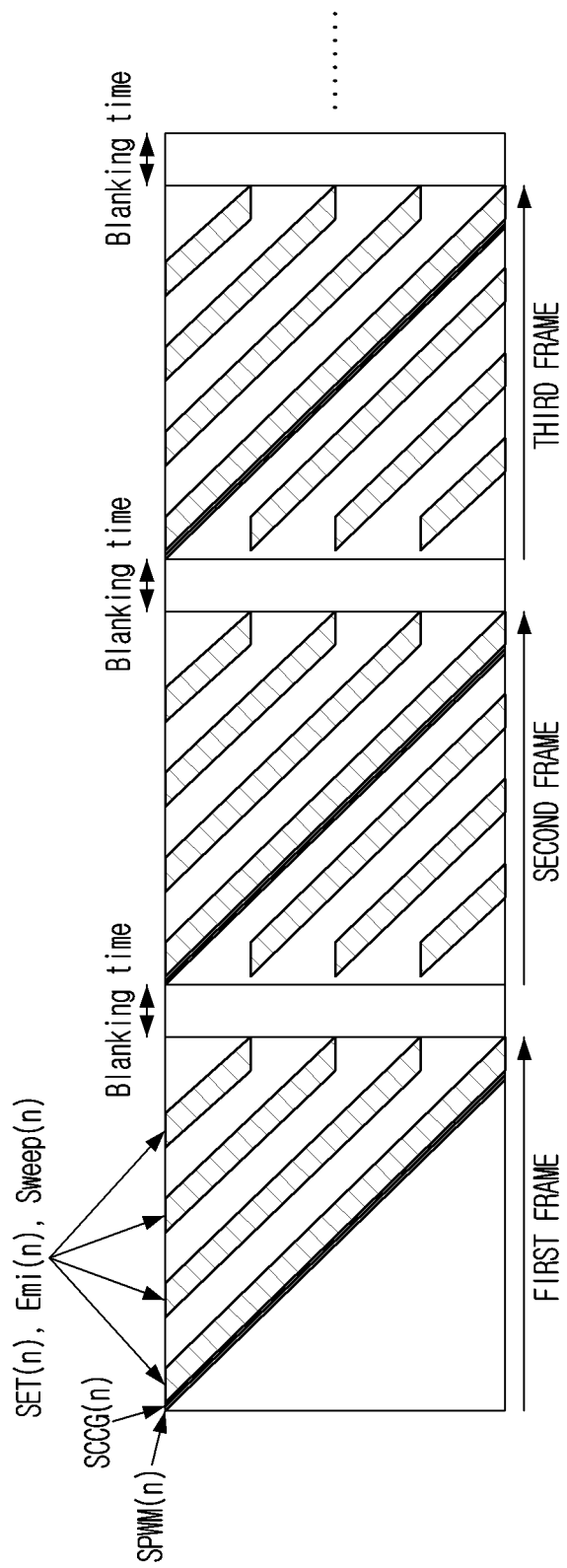
FIG. 5A is a diagram illustrating a driving method of a display panel for a plurality of image frames.

FIG. 5A illustrates a driving method of the display panel 100 for a plurality of image frames. In each frame in FIG. 5A, the vertical axis represents a row line, and the horizontal axis represents time. Also, the blanking time represents a time period between a frame to which effective image data is not applied and a frame.

SPWM(n) and SCCG(n) represent control signals of the driver 500 applied to sub-pixels included in each nth row line for a data setting operation, and SET(n), Emi(n), and Sweep(n) represent control signals of the driver 500 applied to sub-pixels included in the nth row line for a light emitting operation. A detailed content regarding various kinds of control signals of the driver 500 as above will be described later.

Referring to FIG. 5A, it can be seen that, during one image frame time, a data setting section (i.e., a time period during which control signals SPWM(n) and SCCG(n) are applied) proceeds once, and a light emitting section (i.e., a time period during which control signals SET(n), Emi(n), and Sweep(n) are applied) proceed a plurality of times for each row line.

That is, according to an embodiment of the disclosure, the driver 500 may set an image data voltage to the sub-pixels included in each row line during a data setting section for each row line, and in a plurality of light emitting sections for each row line, drive the display panel 100 so that the sub-pixels included in each row line emit light based on the set image data voltage.

FIG. 5B is a diagram that illustrates the second frame illustrated in FIG. 5A in more detail. In FIG. 5B, the vertical axis represents a row line, and the horizontal axis represents time. In FIG. 5B, an example in which the display panel 100 consists of 40 row lines is suggested, for the convenience of explanation.

Referring to FIG. 5B, the driver 500, for example, applies control signals SPWM(n) and SCCG(n) to the sub-pixels included in the first row line during a data setting section 61 for the first row line. Accordingly, image data voltages provided from the data driver are respectively set or programmed to the sub-pixels included in the first row line.

Afterwards, the driver 500 applies control signals SET(n), Emi(n), and Sweep(n) to the sub-pixels included in the first row line during a first light emitting section 62 for the first row line. Accordingly, the sub-pixels included in the first row line respectively emit light based on the image data voltages set in the data setting section 61 inside the first light emitting section 62.

Afterwards, the driver 500 applies the control signals SET(n), Emi(n), and Sweep(n) to the sub-pixels included in the first row line in a second light emitting section 63 for the first row line, as in the first light emitting section 62. Accordingly, the sub-pixels included in the first row line also respectively emit light in the second light emitting section 63 based on the image data voltages set in the data setting section 61.

This is the same in a third light emitting section 64 and a fourth light emitting section 65 for the first row line.

The driver 500 may perform the aforementioned operations for the first row line to the sub-pixels included in the remaining row lines (the second row line to the 40th row line) sequentially in the order of the row lines, as illustrated in FIG. 5B.

In FIG. 5B, only one frame section (i.e., the second frame section) is illustrated, and thus it is illustrated that from the 11th row line to the 20th row line, only three times of light emitting sections proceed after a data setting section proceeds, and from the 21st row line to the 30th row line, only two times of light emitting sections proceed after a data setting section proceeds, and from the 31st row line to the 40th row line, only one time of a light emitting section proceeds after a data setting section proceeds. However, referring to the second frame section and the third frame section illustrated in FIG. 5A together, it can be known that from the 11th row line to the 40th row line, four times of light emitting sections also proceed respectively after a data setting section proceeds.

According to the example illustrated in FIG. 5B, it can be seen that the first light emitting section 62 among the plurality of light emitting sections for the first row line is temporally continuous with the data setting section 61 for the first row line, and each of the plurality of light emitting sections (62 to 65) has a preset time interval. This is the same in the remaining row lines.

Here, according to an embodiment of the disclosure, the number of light emitting sections that proceed in each row line during one image frame section and a preset time interval between the light emitting sections may be set based on the size of the display panel 100 and/or a shutter speed of a camera, etc. However, the disclosure is not limited thereto.

As described above, the display panel 100 is driven so that a plurality of light emitting sections proceed at a preset time interval during one image frame time, and the preset time interval is set based on the speed of the camera. Accordingly, no matter at any moment the display panel 100 is captured, an image displayed on the display panel 100 captured by the camera may not be distorted.

The data setting sections and the light emitting sections illustrated in FIG. 5B were illustrated just for conceptually explaining the proceeding processes of a data setting operation and a light emitting operation that proceed in the order of the row lines according to time, and the specific driving timings of the control signals SPWM(n) and SCCG(n) for data setting and the control signals SET(n), Emi(n), and Sweep(n) for a light emitting operation are not limited to what is illustrated in FIG. 5B.

Figure 5D:
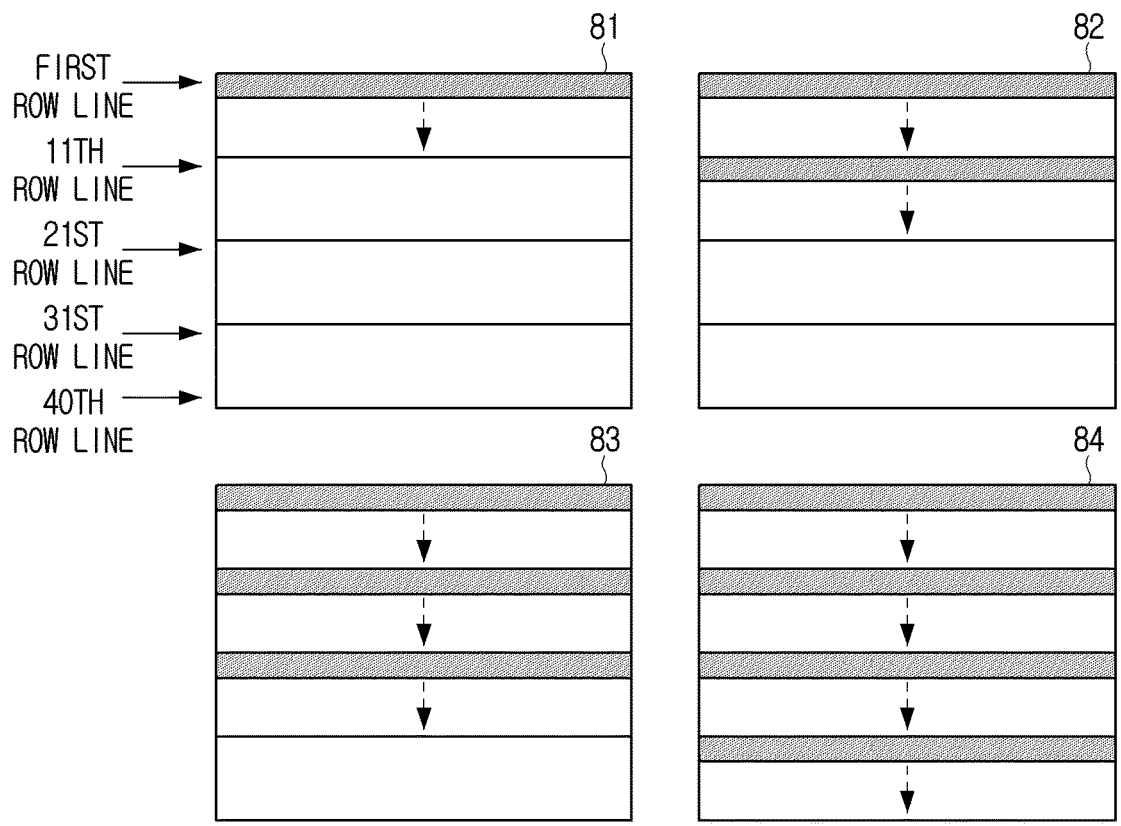
FIG. 5D is a diagram illustrating a light emitting operation of a display panel according to an embodiment of the disclosure.
Figure 5E:
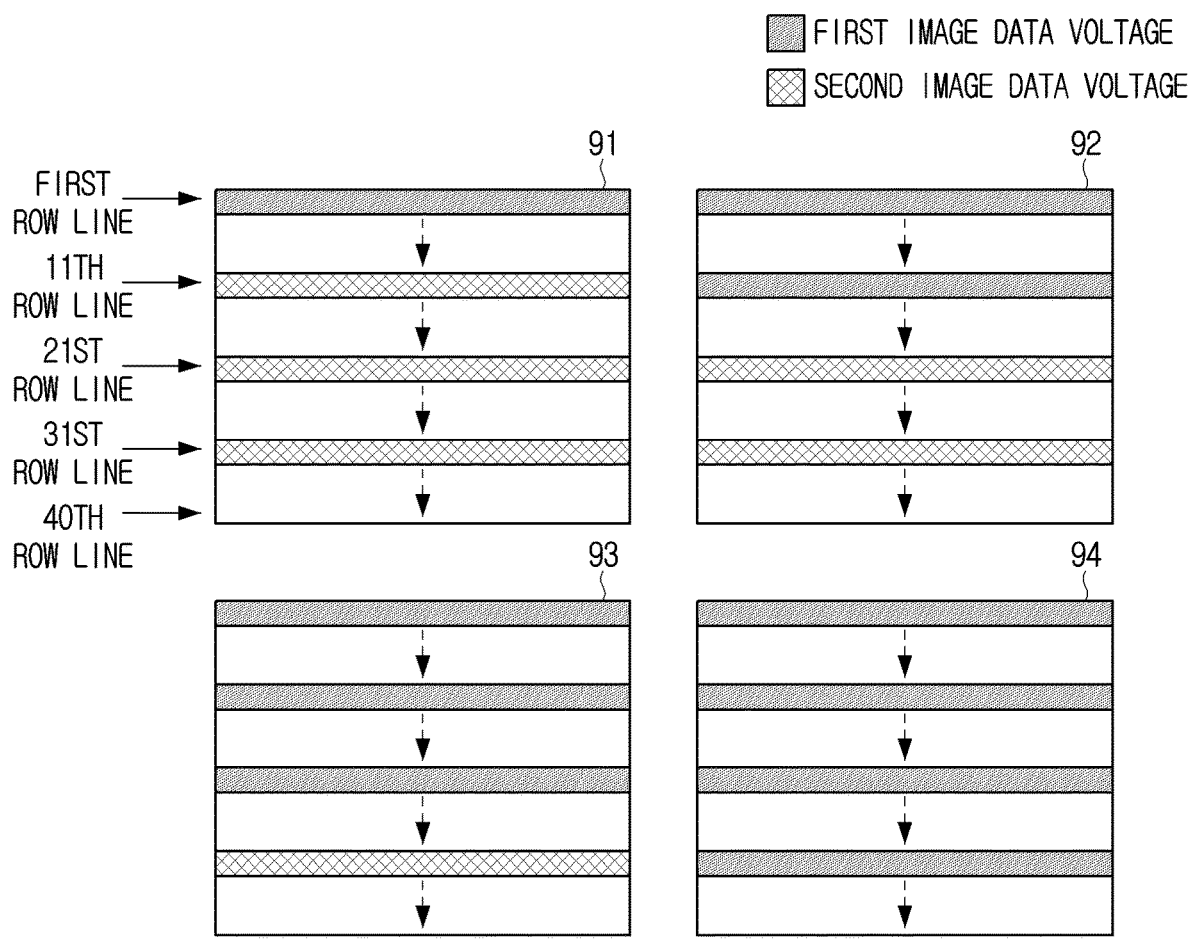
FIG. 5E is a diagram illustrating a light emitting operation of a display panel according to an embodiment of the disclosure.

Hereinafter, an image displayed on the display panel 100 during one image frame time will be described by referring to FIG. 5C to FIG. 5E together with FIG. 5B. FIG. 5C to FIG. 5E are illustrated on the assumption of a case that an image data voltage corresponding to a full white gray scale is set to each sub-pixel of the display panel 100, for the convenience of explanation.

FIG. 5C illustrates light emitting operations of the first row line to the 10th row line of the display panel 100 during the ① time illustrated in FIG. 5B in case the display panel 100 is driven as in FIG. 5B during one image frame time.

Specifically, when the first light emitting section 62 of the first row line starts, the first row line of the display panel 100 starts to emit light, as illustrated in reference numeral 71 in FIG. 5C. Specifically, the sub-pixels included in the row line emit light, but hereinafter, it will be expressed that the row line emits light in an abridged form, for the convenience of explanation.

Afterwards, when the first light emitting section of the second row line starts, as it is before the light emitting section of the first row line is completed, the first row line and the second row line emit light together, as illustrated in reference numeral 72 in FIG. 5C.

Afterwards, when the first light emitting section of the third row line starts, as it is before the light emitting sections of the first row line and the second row line are completed, the first to third row lines emit light together, as illustrated in reference numeral 73 in FIG. 5C.

Afterwards, when the first light emitting section of the fourth row line starts, as the first light emitting section 62 of the first row line was completed, the first row line stops emitting light, and the second to fourth row lines emit light together, as illustrated in reference numeral 74 in FIG. 5C.

In a manner as described above, light emission of three row lines sequentially proceeds until the 10th row line. Reference numeral 75 of FIG. 5C illustrates an embodiment in which the first light emitting section of the 10th row line starts, and the eighth to 10th row lines emit light.

Afterwards, when the second light emitting section 63 of the first row line starts, as the first light emitting section of the eight row line was completed, the first row line emits light again together with the ninth to 10th row lines, as illustrated in reference numeral 76 in FIG. 5C.

Afterwards, when the second light emitting section of the second row line starts, as the first light emitting section of the ninth row line was completed, the 10th row line, the first row line, and the second row line emit light together, as illustrated in reference numeral 77 in FIG. 5C.

Lastly, when the second light emitting section of the third row line starts, as the first light emitting section of the 10th row line was completed, the first to third row lines emit light together again, as illustrated in reference numeral 78 in FIG. 5C.

Likewise, afterwards, the light emitting operations of the three row lines are sequentially repeated as described above.

In the above, the light emitting operations of the first to 10th row lines were described, but referring to the proceedings of the light emitting sections according to time illustrated in FIG. 5C, it can be known that in the case of the 11th to 20th row lines, the 21st to 30th row lines, and the 31st to 40th row lines, each row line may emit light in the same manner as described above through the first to 10th row lines.

However, in the case of the 11th to 20th row lines, the 21st to 30th row lines, and the 31st to 40th row lines, it can be known that there is a difference in the image data voltage that becomes the basis for light emission from the case of the first to 10th row lines.

Hereinafter, through FIG. 5D and FIG. 5E, the light emitting operations of the entire row lines of the display panel 100 will be reviewed.

FIG. 5D illustrates light emitting operations of the row lines based on an image data voltage (referred to as a first image data voltage hereinafter) that was applied during the image frame section illustrated in FIG. 5B (i.e., the second frame section in FIG. 5A). The order of the light emitting sections used in the description regarding FIG. 5D and FIG. 5E (i.e., the first light emitting section, the second light emitting section, the third light emitting section, and the fourth light emitting section) means the order of the light emitting sections based on the first image data voltage.

Light emitting operations of the row lines based on an image data voltage (referred to as a second image data voltage hereinafter) that was applied during the first frame section in FIG. 5A are not illustrated in FIG. 5D.

As described above in FIG. 5C, the first to 10th row lines sequentially emit light based on the first image data voltage applied to each row line during the first light emitting section. Reference numeral 81 in FIG. 5D shows this operation.

Afterwards, when the first light emitting sections of the 11th to 20th row lines proceed together with the second light emitting sections of the first to 10th row lines, the first to 10th row lines and the 11th to 20th row lines sequentially emit light respectively based on the first image data voltage, as illustrated in reference numeral 82 in FIG. 5D.

Afterwards, when the third light emitting sections of the first to 10th row lines, the second light emitting sections of the 11th to 20th row lines, and the first light emitting sections of the 21st to 30th row lines proceed together, the first to 10th row lines, the 11th to 20th row lines, and the 21st to 30th row lines sequentially emit light respectively based on the first image data voltage, as illustrated in reference numeral 83 in FIG. 5D.

Lastly, when the fourth light emitting sections of the first to 10th row lines, the third light emitting sections of the 11th to 20th row lines, the second light emitting sections of the 21st to 30th row lines, and the first light emitting sections of the 31st to 40th row lines proceed together, the first to 10th row lines, the 11th to 20th row lines, the 21st to 30th row lines, and the 31st to 40th row lines sequentially emit light respectively based on the first image data voltage, as illustrated in reference numeral 84 in FIG. 5D.

According to an embodiment of the disclosure, the plurality of row liens included in the display panel 100 may be divided into a plurality of groups respectively including continued row lines.

In the aforementioned example, the first to 10th row lines may be divided into a first group, the 11th to 20th row lines may be divided into a second group, the 21st to 30th row lines may be divided into a third group, and the 31st to 40th row lines may be divided into a fourth group, respectively.

Here, the driver 500 may apply an image data voltage to the sub-pixels included in each row line in the order of the row lines from the first row line to the last row line of the plurality of row lines, during one image frame section.

That is, as illustrated in FIG. 5B, it can be seen that the driver 500 applies the first image data voltage to the sub-pixels included in each row line in the order of the row lines from the first row line to the 40th row line during one image frame section (i.e., the second frame section in FIG. 5A).

Also, during the one image frame section, the driver 500 may drive the display panel 100 so that the sub-pixels included in one group among the plurality of groups emit light in the order of the row lines, and then the sub-pixels included in each of at least two continued groups emit light in the order of the row lines based on the applied first image data voltage. Here, the at least two continued groups include the one group.

That is, during one image frame section (i.e., the second frame section in FIG. 5A), the driver 500 may drive the display panel 100 so that the sub-pixels included in the first group emit light in the order of the row lines based on the first image data voltage, as illustrated in reference numeral 81 in FIG. 5D, and then the sub-pixels included in each of the first group and the second group emit light in the order of the row lines based on the first image data voltage, as illustrated in reference numeral 82 in FIG. 5D.

Also, during one image frame section (i.e., the second frame section in FIG. 5A), the driver 500 may drive the display panel 100 so that the sub-pixels included in each of the first group and the second group emit light in the order of the row lines based on the first image data voltage, as illustrated in reference numeral 82 in FIG. 5D, and then the sub-pixels included in each of the first to third groups emit light in the order of the row lines based on the first image data voltage, as illustrated in reference numeral 83 in FIG. 5D.

In addition, during one image frame section (i.e., the second frame section in FIG. 5A), the driver 500 may drive the display panel 100 so that the sub-pixels included in each of the first to third groups emit light in the order of the row lines based on the first image data voltage, as illustrated in reference numeral 83 in FIG. 5D, and then the sub-pixels included in each of the first to fourth groups emit light in the order of the row lines based on the first image data voltage, as illustrated in reference numeral 84 in FIG. 5D.

FIG. 5E illustrates light emitting operations of the entire row lines of the display panel 100 based on the first image data voltage and the second image data voltage.

Referring to FIG. 5E, it can be seen that, while the first light emitting sections for the first to 10th row lines proceed in the order of the row lines, the light emitting sections for the 11th to 20th row lines, the 21st to 30th row lines, and the 31st to 40th row lines also proceed together in the order of the row lines for each group. Here, the first to 10th row lines emit light based on the first image data voltage, and the remaining row lines emit light based on the second image data voltage, and reference numeral 91 in FIG. 5E illustrates this operation.

Referring to FIG. 5E, while the second light emitting sections for the first to 10th row lines and the first light emitting sections for the 11th to 20th row lines respectively proceed in the order of the row lines, the light emitting sections for the 21st to 30th row lines and the 31st to 40th row lines also proceed together in the order of the row lines for each group. Here, the first to 10th row lines emit light based on the first image data voltage, and the remaining row lines emit light based on the second image data voltage, and reference numeral 92 in FIG. 5E illustrates this operation.

Referring to FIG. 5E again, while the third light emitting sections for the first to 10th row lines, the second light emitting sections for the 11th to 20th row lines, and the first light emitting sections for the 21st to 30th row lines respectively proceed in the order of the row lines, the light emitting sections for the 31st to 40th row lines also proceed together in the order of the row lines. Here, the first to 30th row lines emit light based on the first image data voltage, and the 31st to 40th row lines emit light based on the second image data voltage, and reference numeral 93 in FIG. 5E illustrates this.

Referring to FIG. 5E again, the fourth light emitting sections for the first to 10th row lines, the third light emitting sections for the 11th to 20th row lines, the second light emitting sections for the 21st to 30th row lines, and the first light emitting sections for the 31st to 40th row lines respectively proceed together in the order of the row lines. Here, all of the first to 40th row lines get to emit light based on the first image data voltage, and reference numeral 94 in FIG. 5E illustrates this operation. It can be seen that reference numeral 94 in FIG. 5E is the same as reference numeral 84 in FIG. 5D.

Specifically, during one image frame section (e.g., the second frame section in FIG. 5A), the driver 500 may drive the display panel 100 so that the sub-pixels included in one group among the plurality of groups emit light in the order of the row lines, and then the sub-pixels included in each of at least two continued groups emit light in the order of the row lines based on the first image data voltage, as described above in FIG. 5D.

At the same time, during the one image frame section (e.g., the second frame section in FIG. 5A), the driver 500 may drive the display panel 100 so that the sub-pixels included in each of the remaining groups excluding at least one group driven based on the first image data voltage among the plurality of groups emit light in the order of the row lines based on the second image data voltage.

As described above, it can be known that, during one image frame section (e.g., the second frame section in FIG. 5A), the driver 500 may drive the display panel 100 as described above through FIG. 5E by driving the display panel 100 so that the sub-pixels included in each row line of each of the plurality of groups emit light a plurality of times based on at least one of the first or second image data voltage in the plurality of light emitting sections for each row line.

In the above, for the convenience of explanation, an example in which the display panel 100 includes 40 row lines, and light emitting sections proceed four times for each row line was suggested, but embodiments are not limited thereto, and there may be various embodiments depending on the size or implementation examples of the display panel 100. For example, the display panel 100 in which 480 pixels are arranged on each of 270 row lines may be provided, and the driver 500 may drive the display panel 100 so that nine times of light emitting sections proceed for each row line.

Hereinafter, the configuration of the display device 1000 and an external compensation method according to an embodiment of the disclosure will be described in more detail through FIG. 6.

Figure 6:
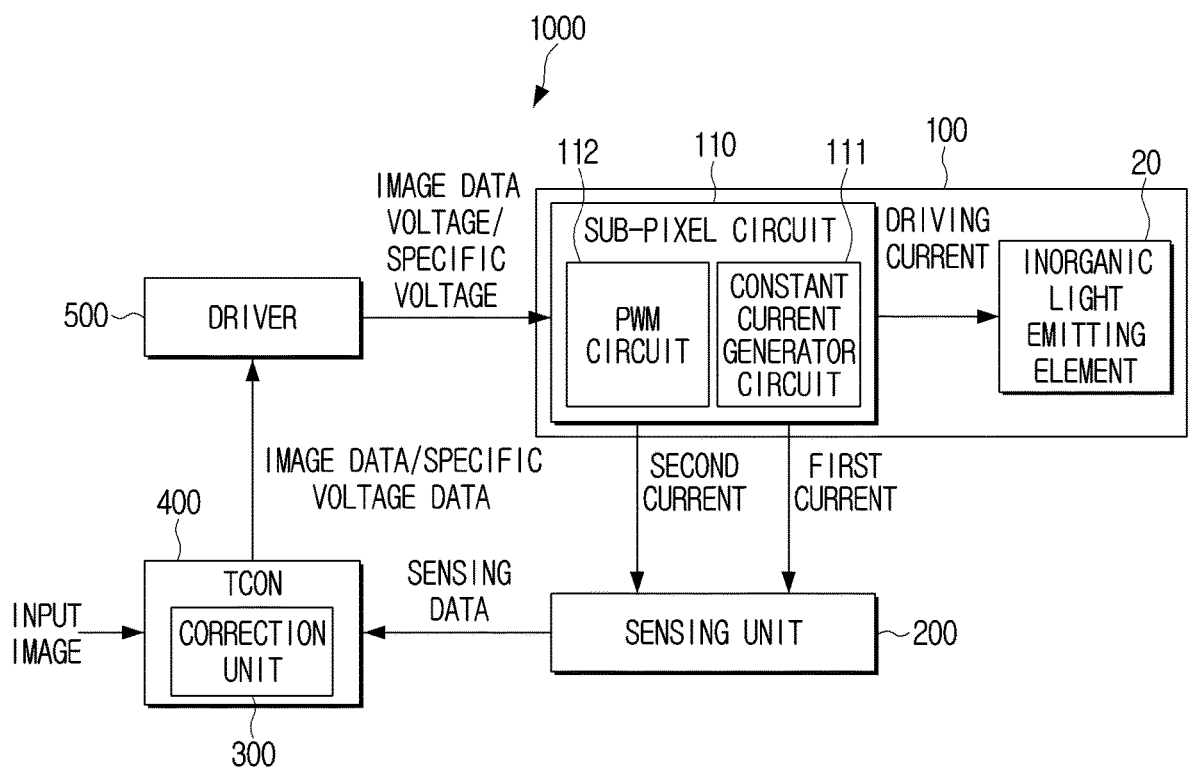
FIG. 6 is a block diagram illustrating a display device according to an embodiment of the disclosure in more detail.

FIG. 6 is a block diagram illustrating a display device according to an embodiment of the disclosure in more detail. In describing FIG. 6, descriptions regarding contents overlapping with those described above in FIG. 4 to FIG. 5E will be omitted.

According to FIG. 6, the display device 1000 includes a display panel 100, a sensing unit 200, a correction unit 300, a timing controller 400 (referred to as a TCON hereinafter), and a driver 500.

The TCON 400 controls the overall operations of the display device 1000. In particular, the TCON 400 may perform sensing driving and display driving of the display device 1000.

Here, the sensing driving is a driving that updates a compensation value for compensating deviations in the threshold voltages Vth and the mobility μ of the driving transistors included in the display panel 100, and the display driving is a driving that displays an image on the display panel 100 based on an image data voltage to which the compensation value is reflected.

When the display driving is performed, the TCON 400 provides image data for an input image to the driver 500. Here, the image data provided to the driver 500 may be image data for which correction is performed by the correction unit 300.

The correction unit 300 may correct image data for an input image based on a compensation value. Here, the compensation value may be a compensation value that is acquired through the sensing driving to be described below.

As illustrated in FIG. 6, the correction unit 300 may be implemented as one function module of the TCON 400 that is mounted on the TCON 400. However, the disclosure is not limited thereto, and the correction unit 300 may be mounted on a separate processor different from the TCON 400, and it may also be implemented as a separate chip in an application specific integrated circuit (ASIC) or a field-programmable gate array (FPGA) type.

The driver 500 may generate an image data voltage based on image data provided from the TCON 400, and provide the generated image data voltage to the display panel 100. Accordingly, the display panel 100 may display an image based on the image data voltage provided from the driver 500.

When the sensing driving is performed, the TCON 400 may provide specific voltage data for sensing a current flowing in the driving transistor included in the sub-pixel circuit 110 to the driver 500.

The driver 500 may generate a specific voltage corresponding to the specific voltage data and provide the voltage to the display panel 100, and accordingly, a current based on the specific voltage may flow in the driving transistor included in the sub-pixel circuit 110 of the display panel 100.

The sensing unit 200 may sense the current flowing in the driving transistor and output sensing data to the correction unit 300, and the correction unit 300 may acquire or update a compensation value for correcting the image data based on the sensing data.

Hereinafter, each component illustrated in FIG. 6 will be described in more detail.

The display panel 100 includes an inorganic light emitting element 20 constituting a sub-pixel, and a sub-pixel circuit 110 for providing a driving current to the inorganic light emitting element 20. In FIG. 6, only a structure related to one sub-pixel included in the display panel 100 is illustrated for the convenience of explanation, but the sub-pixel circuit 110 and the inorganic light emitting element 20 may be provided for each sub-pixel, as described above.

The inorganic light emitting element 20 may represent gray scale values of different brightness according to the magnitude of the driving current provided from the sub-pixel circuit 110 and the duration of the driving current. Here, instead of the term duration, a pulse width or a duty ratio may be used as the same meaning.

For example, the inorganic light emitting element 20 may represent a brighter gray scale value as the magnitude of the driving current is bigger. Also, the inorganic light emitting element 20 may express a brighter gray scale value as the duration of the driving current is longer (i.e., as the pulse width is longer or the duty ratio is higher).

Here, the inorganic light emitting element 20 means a light emitting element that is manufactured using an inorganic material, which is different from an organic light emitting diode (OLED) that is manufactured using an organic material.

In particular, according to an embodiment of the disclosure, the inorganic light emitting element 20 may be a micro light emitting diode (micro LED or μLED) having a size that is less than or equal to 100 micrometers (μm).

A display panel in which each sub-pixel is implemented with a micro LED is called a micro LED display panel. A micro LED display panel is one of flat display panels, and it consists of a plurality of inorganic LEDs, each of which is less than or equal to 100 micrometers. A micro LED display panel provides better contrast, response time, and energy efficiency compared to a liquid crystal display (LCD) panel requiring a backlight. Both of an organic LED (OLED) and a micro LED have good energy efficiency, but a micro LED provides better performance than an OLED in terms of the brightness, light emission efficiency, and lifespan.

The sub-pixel circuit 110 provides a driving current to the inorganic light emitting element 20 at the time of the aforementioned display driving. Specifically, the sub-pixel circuit 110 may provide a driving current of which magnitude and duration are controlled to the inorganic light emitting element 20 based on an image data voltage (e.g., a constant current generator data voltage, a PWM data voltage) applied from the driver 500.

That is, the sub-pixel circuit 110 may drive the inorganic light emitting element 20 by the pulse amplitude modulation (PAM) method and/or the pulse width modulation (PWM) method, and control the brightness of the light emitted by the inorganic light emitting element 20.

For this, the sub-pixel circuit 110 may include a constant current generator circuit 111 for providing a constant current having a regular magnitude based on a constant current generator data voltage to the inorganic light emitting element 20, and a PWM circuit 112 for providing the constant current provided from the constant current generator circuit 111 to the inorganic light emitting element 20 during a time corresponding to a PWM data voltage. Here, the constant current provided to the inorganic light emitting element 20 becomes the driving current.

The constant current generator circuit 111 and the PWM circuit 112 respectively include a driving transistor. Hereinafter, for the convenience of explanation, the driving transistor included in the constant current generator circuit 111 will be referred to as a first driving transistor, and the driving transistor included in the PWM circuit 112 will be referred to as a second driving transistor.

When the aforementioned sensing driving is performed, if a first specific voltage is applied to the constant current generator circuit 111, a first current corresponding to the first specific voltage flow in the first driving transistor, and if a second specific voltage is applied to the PWM circuit 112, a second current corresponding to the second specific voltage flow in the second driving transistor.

Accordingly, the sensing unit 200 may respectively sense the first and second currents, and respectively output first sensing data corresponding to the first current and second sensing data corresponding to the second current to the correction unit 300. For this, the sensing unit 200 may include a current detector and an analog to digital converter (ADC). Here, the current detector may be implemented by using a current integrator including an operational amplifier (OP-AMP) and a capacitor, but the disclosure is not limited thereto.

The correction unit 300 may identify a sensing data value corresponding to the first specific voltage in a look-up table including sensing data values for each voltage, compare the identified sensing data value and a first sensing data value output from the sensing unit 200, and calculate or acquire a first compensation value for correcting the constant current generator data voltage.

Also, the correction unit 300 may identify a sensing data value corresponding to the second specific voltage in the look-up table including sensing data values for each voltage, compare the identified sensing data value and a second sensing data value output from the sensing unit 200, and calculate or acquire a second compensation value for correcting the PWM data voltage.

The first and second compensation values acquired as above may be stored or updated in a memory inside or outside the correction unit 300, and they may be used in correcting the image data voltage when the display driving is performed afterwards.

Specifically, the correction unit 300 may correct image data to be provided to the driver 500 (in particular, the data driver) by using the compensation values, and thereby correct the image data voltage applied to the sub-pixel circuit 110.

That is, the data driver provides an image data voltage based on input image data to the sub-pixel circuit 110, and thus the correction unit 300 may correct the image data voltage applied to the sub-pixel circuit 110 by correcting the image data value.

More specifically, when the display driving is performed, the correction unit 300 may correct the constant current generator data value in the image data based on the first compensation value. Also, the correction unit 300 may correct the PWM data value in the image data based on the second compensation value. Accordingly, the correction unit 300 may respectively correct the constant current generator data voltage and the PWM data voltage applied to the sub-pixel circuit 110.

As described above, the driver 500 may include at least one gate driver circuit (or a scan driver circuit) for providing a control signal for driving pixels on the pixel array in units of row lines.

Also, the driver 500 may include a source driver circuit (or a data driver circuit) for providing an image data voltage or a specific voltage to each pixel (or each sub-pixel) on the pixel array. Here, the data driver may include a digital to analog converter (DAC) for respectively converting the image data and the specific voltage data provided from the TCON 400 into an image data voltage and a specific voltage.

Figure 7A:
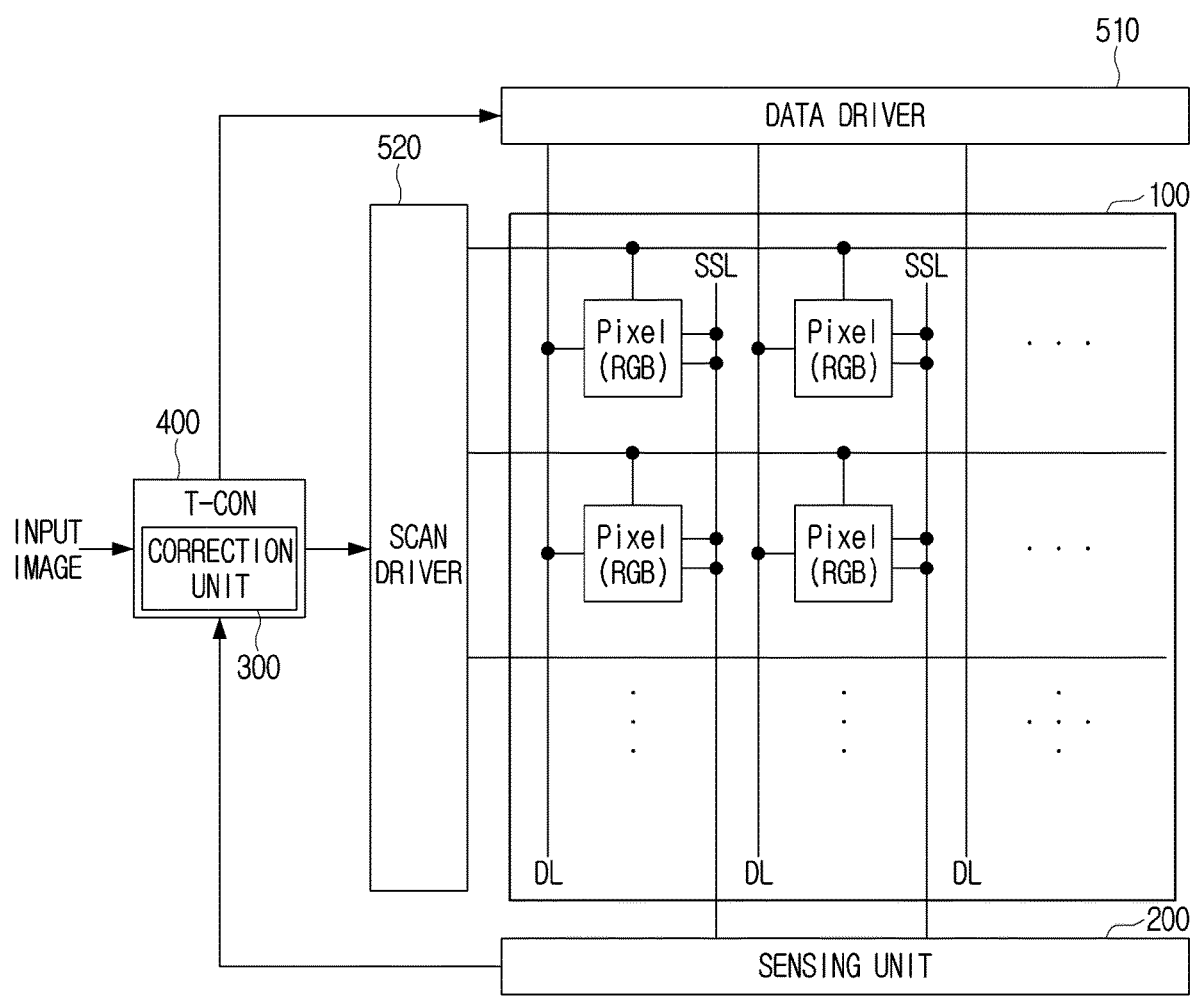
FIG. 7A is a diagram illustrating an implementation example of a sensing unit according to an embodiment of the disclosure.
Figure 7B:
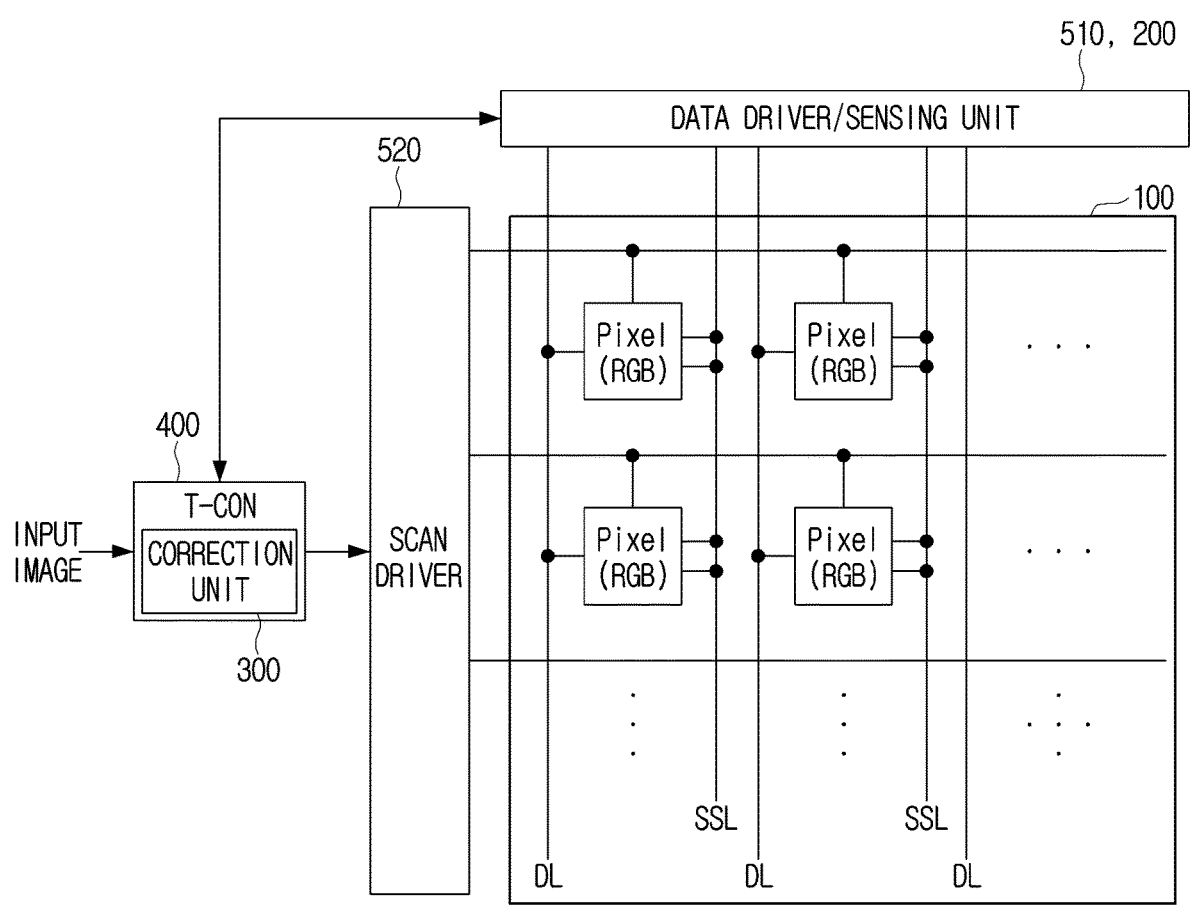
FIG. 7B is a diagram illustrating an implementation example of another sensing unit according to another embodiment of the disclosure.

FIG. 7A and FIG. 7B are diagrams illustrating implementation examples of the sensing unit 200. Referring to FIG. 7A and FIG. 7B, the display panel 100 includes a plurality of pixels arranged in each region in which a plurality of data lines (DLs) and a plurality of scan lines (SCLs) intersect in a matrix form.

Here, each pixel may include three sub-pixels such as R, G, and B. Each sub-pixel included in the display panel 100 may include the inorganic light emitting element 20 in a corresponding color and the sub-pixel circuit 110, as described above.

Here, the data line (DL) is a line for applying the aforementioned image data voltage (specifically, a constant current generator data voltage and a PWM data voltage) and a specific voltage to each sub-pixel included in the display panel 100, and the scan line (SCL) is a line for selecting the pixels (or the sub-pixels) included in the display panel 100 for each row line.

Accordingly, an image data voltage or a specific voltage applied from the data driver 510 through the data line (DL) may be applied to the pixels (or the sub-pixels) of the row line selected through a control signal (e.g., an SPWM(n) signal, an SCCG(n) signal, an SP(n) signal, etc.) applied from the scan driver 520.

Here, voltages (an image data voltage and a specific voltage) to be applied to each of R, G, and B sub-pixels may be time division multiplexed and applied to the display panel 100. The voltages that are time division multiplexed as above may be respectively applied to the corresponding sub-pixels through a DeMUX circuit.

Depending on embodiments, unlike FIG. 7A and FIG. 7B, a separate data line may be provided for each of R, G, and B sub-pixels, and in this case, the voltages (an image data voltage and a specific voltage) to be applied to each of the R, G, and B sub-pixels may be simultaneously applied to the corresponding sub-pixels through the corresponding data lines.

In this case, a DeMUX circuit may not be needed.

This is the same for a sensing line (SSL). That is, according to an embodiment of the disclosure, a sensing line (SSL) may be provided for each column line of a pixel, as shown in FIG. 7A and FIG. 7B. In this case, a DeMUX circuit may be needed for an operation of the sensing unit 200 for each of R, G, and B sub-pixels.

Also, according to another embodiment of the disclosure, unlike in FIG. 7A and FIG. 7B, a sensing line (SSL) may be provided in units of column lines of a sub-pixel. In this case, a separate DeMUX circuit is not needed for an operation of the sensing unit 200 for each of R, G, and B sub-pixels. However, compared to the embodiments illustrated in FIG. 7A and FIG. 7B, unit components of the sensing unit 200 to be described below will be needed three times more.

In FIG. 7A and FIG. 7B, only one scan line is illustrated for one row line, for the convenience of illustration. However, the actual number of the scan lines may vary in any way depending on the driving method of the pixel circuit 110 included in the display panel 100 or implementation examples. For example, five scan lines for providing each of the control signals described above in FIG. 5A (SPWM(n), SCCG(n), SET(n), Emi(n), and Sweep(n)) may be provided for each row line.

The first and second currents flowing in the first and second driving transistors based on specific voltages as described above may be transmitted to the sensing unit 200 through the sensing line (SSL). Accordingly, the sensing unit 200 may sense each of the first and second currents, and respectively output the first sensing data corresponding to the first current and the second sensing data corresponding to the second current to the correction unit 300.

Here, according to an embodiment of the disclosure, the sensing unit 200 may be implemented as a separate integrated circuit (IC) from the data driver 510 as illustrated in FIG. 7A, or it may be implemented as one IC together with the data driver 510 as illustrated in FIG. 7B.

The correction unit 300 may correct the constant current generator data voltage based on the first sensing data output from the sensing unit 200, and correct the PWM data voltage based on the second sensing data, as described above.

As described above, in FIG. 7A and FIG. 7B, an example in which the first and second currents are transmitted to the sensing unit 200 through a separate sensing line (SSL) from the data line (DL) is suggested. However, embodiments are not limited thereto. For example, in case the data driver 510 and the sensing unit 200 are implemented as one IC as in FIG. 7B, an embodiment in which the first and second currents are transmitted to the sensing unit 200 through the data line (DL) without the sensing line (SSL) may be possible.

Hereinafter, detailed embodiments of the disclosure will be described with reference to FIG. 8A to FIG. 13B.

Figure 8A:
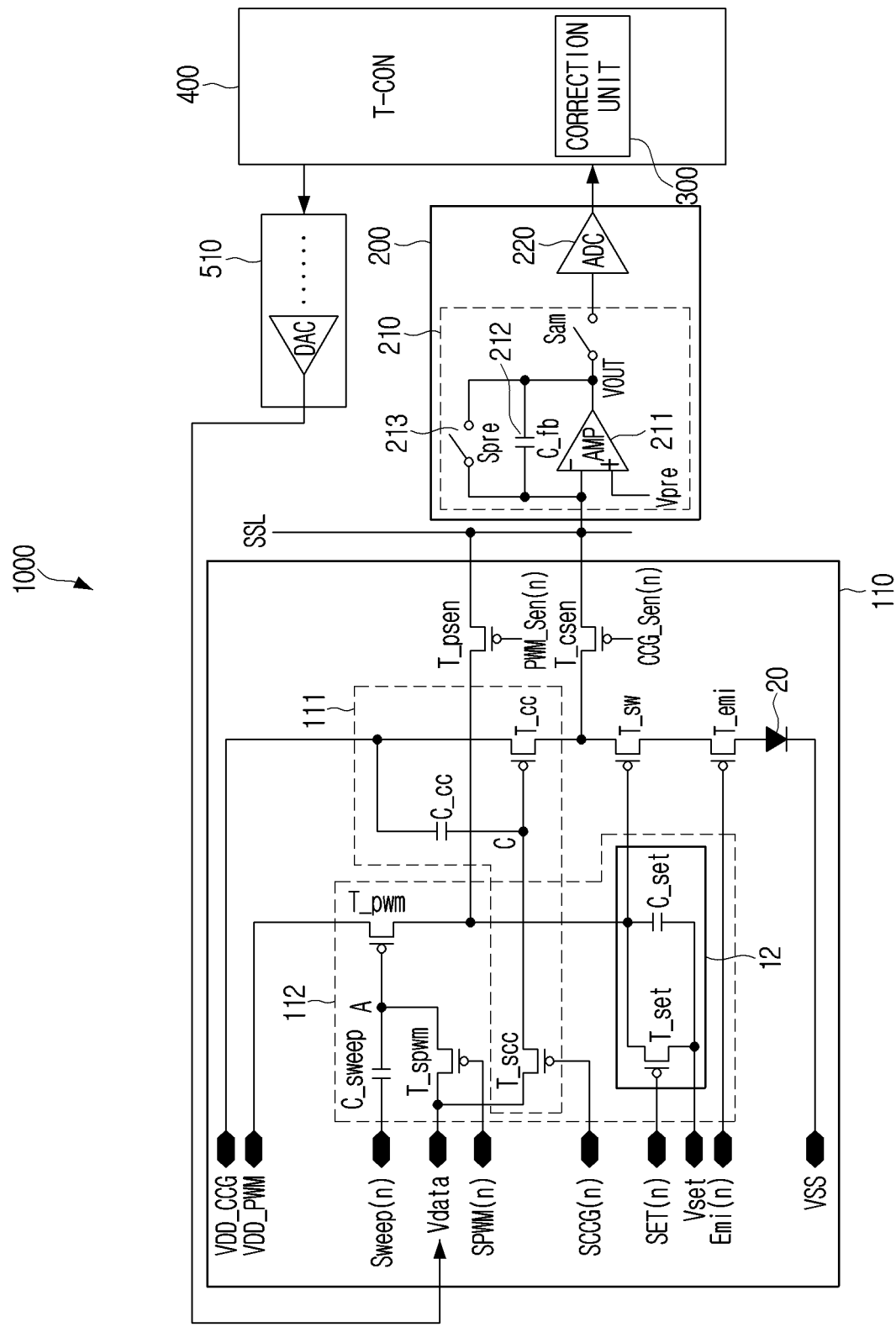
FIG. 8A is a detailed circuit diagram of a pixel circuit and a sensing unit according to an embodiment of the disclosure.

FIG. 8A is a detailed circuit diagram of the sub-pixel circuit 110 and the sensing unit 200 according to an embodiment of the disclosure. In FIG. 8A, for the convenience of understanding, the data driver 510, the correction unit 300, and the TCON 400 are illustrated together.

FIG. 8A illustrates in detail the unit components of a circuit related to one sub-pixel, i.e., one inorganic light emitting element 20, and the sub-pixel circuit 110 for driving the inorganic light emitting element 20, and the sensing unit 200 for sensing currents flowing in the driving transistors T_cc, T_pwm included in the sub-pixel circuit 110.

According to FIG. 8A, the sub-pixel circuit 110 may include a constant current generator circuit 111, a PWM circuit 112, a transistor T_sw, a transistor T_emi, a transistor T_csen, and a transistor T_psen.

The constant current generator circuit 111 includes a first driving transistor T_cc of which source terminal is connected with a driving voltage (VDD_CCG) terminal, a capacitor C_cc connected between the source terminal and the gate terminal of the first driving transistor T_cc, and a transistor T_scc that is controlled to be turned on/turned off according to a control signal SCCG(n), and is for applying the constant current generator data voltage applied from the data driver 510 to the gate terminal of the first driving transistor T_cc while it is turned on.

The PWM circuit 112 includes a second driving transistor T_pwm of which source terminal is connected with a driving voltage (VDD_PWM) terminal, a capacitor C_sweep that is for coupling a sweep voltage that linearly changes to the gate terminal of the second driving transistor T_pwm, and a transistor T_spwm that is controlled to be turned on/turned off according to a control signal SPWM(n), and is for applying the PWM data voltage applied from the data driver 510 to the gate terminal of the second driving transistor T_pwm while it is turned on.

Also, the PWM circuit 112 includes a reset unit 12. The reset unit 12 is a component for forcefully turning on the transistor T_sw before each light emitting section starts. In order that a constant current flows in the inorganic light emitting element 20 and the inorganic light emitting element 20 emits light, the transistor T_sw must be in a turned-on state. However, as will be described below, when light emission of the inorganic light emitting element 20 is completed in each light emitting section, the transistor T_sw is turned off, and thus there is a need to forcefully turn on the transistor T_sw before each light emitting section starts. According to an embodiment of the disclosure, by making the transistor T_sw be in a turned-on state on the starting point of each of the plurality of light emitting sections through the operation of the reset unit 12, the plurality of light emitting sections may operate normally.

Referring to FIG. 8A, the drain terminal of the second driving transistor T_pwm is connected with the gate terminal of the transistor T_sw. Accordingly, the PWM circuit 112 may control the time that a constant current flows in the inorganic light emitting element 20 by controlling the on/off operations of the transistor T_sw through the on/off operations of the second driving transistor T_pwm and the operation of the reset unit 12.

The source terminal of the transistor T_emi is connected with the drain terminal of the transistor T_sw, and its drain terminal is connected with the anode terminal of the inorganic light emitting element 20. The transistor T_emi is turned on/turned off according to a control signal Emi(n), and electronically connects/separates the transistor T_sw and the inorganic light emitting element 20.

The source terminal of the transistor T_csen is connected with the drain terminal of the first driving transistor T_cc, and its drain terminal is connected with the sensing unit 200. While sensing driving is performed, the transistor T_csen is turned on according to a control signal CCG_Sen(n), and transmits the first current flowing in the first driving transistor T_cc to the sensing unit 200 through the sensing line (SSL).

The source terminal of the transistor T_psen is connected with the drain terminal of the second driving transistor T_pwm, and its drain terminal is connected with the sensing unit 200. While sensing driving is performed, the transistor T_psen is turned on according to a control signal PWM_Sen(n), and transmits the second current flowing in the second driving transistor T_pwm to the sensing unit 200 through the sensing line (SSL).

The cathode terminal of the inorganic light emitting element 20 is connected to the ground voltage (VSS) terminal.

According to FIG. 8A, the unit components of the sensing unit 200 include a current integrator 210 and an ADC 220. Specifically, according to an embodiment of the disclosure, the current integrator 210 may include an amp 211, an integration capacitor 212, a first switch 213, and a second switch 214.

Here, the amp 211 may include an inversion input terminal (−) that is connected to the sensing line (SSL) and receives input of the first and second currents flowing in the first and second driving transistors T_cc, T_pwm of the sub-pixel circuit 110, a non-inversion input terminal (+) that receives input of a reference voltage (Vpre), and an output terminal (Vout).

Also, the integration capacitor 212 may be connected between the inversion input terminal (−) and the output terminal (Vout) of the amp 211, and the first switch 213 may be connected to both ends of the integration capacitor 212. Both ends of the second switch 214 may be respectively connected to the output terminal (Vout) of the amp 211 and the input end of the ADC 220, and the second switch 214 may be switched according to a control signal Sam.

The unit components of the sensing unit 200 illustrated in FIG. 8A may be provided for each sensing line (SSL). For example, in case a sensing line is provided for each column line of a pixel in the display panel 100 including 480 pixel column lines, the sensing unit 200 may include 480 of the unit components.

In case a sensing line is provided for each column line of a sub-pixel in the display panel 100 including 480 pixel column lines in which each pixel includes R, G, and B sub-pixels, the sensing unit 200 may include 1440(=480*3) of the unit components.

Figure 8B:
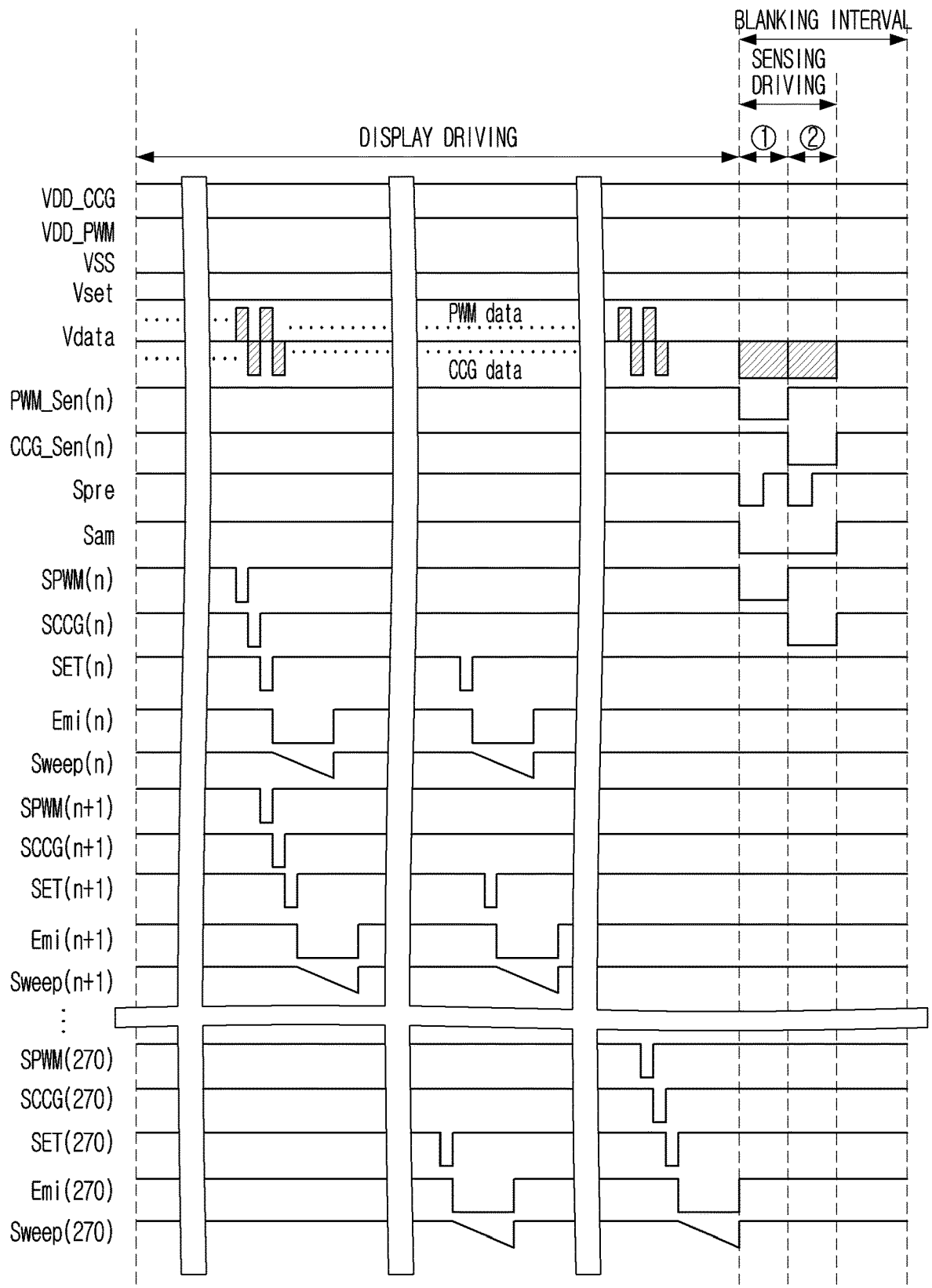
FIG. 8B is a driving timing diagram of a display device according to an embodiment of the disclosure.

FIG. 8B is a driving timing diagram of the display device 1000 according to an embodiment of the disclosure. Specifically, FIG. 8B illustrates various kinds of control signals, driving voltage signals, and data signals applied to the sub-pixel circuits 110 included in the display panel 100 during one image frame time.

Referring to FIG. 8B, the display panel 100 may be driven in the order of display driving and sensing driving during one image frame time.

During the display driving period, control signals SPWM, SCCG, SET, Emi, and Sweep are applied to the display panel 100 as illustrated in FIG. 8B. For example, during the display driving period, control signals SPWM(n), SCCG(n), SET(n), Emi(n), and Sweep(n) are applied to the sub-pixel circuits 110 included in the nth row line of the display panel 100 as illustrated in FIG. 8B.

As described above, according to an embodiment of the disclosure, the image data voltage setting and light emitting operations of the sub-pixels included in one row line (e.g., the nth row line), and the image data voltage setting and light emitting operations of the sub-pixels included in the next row line (e.g., the n+1th row line) may proceed sequentially in the order of the row lines.

Specifically, referring to FIG. 8B, it can be known that, after control signals related to image data voltage setting (SPWM(n) and SCCG(n)) are applied to each row line, control signals related to a light emitting operation (SET(n), Emi(n), and Sweep(n)) are applied a plurality of times.

Also, referring to FIG. 8B, it can be known that control signals related to the nth row line (SPWM(n), SCCG(n), SET(n), Emi(n), and Sweep(n)) and control signals related to the n+1th row line (SPWM(n+1), SCCG(n+1), SET(n+1), Emi(n+1), and Sweep(n+1)) are sequentially applied in the order of the row lines.

The detailed operation of the sub-pixel circuit 110 is described as below by referring to the control signals related to the nth row line (SPWM(n), SCCG(n), SET(n), Emi(n), and Sweep(n)) in FIG. 8B and the circuit in FIG. 8A.

First, when the control signal SPWM(n) is applied to the transistor T_spwm, a PWM data voltage (PWM data) applied from the data driver 510 is set to the gate terminal (referred to as an A node hereinafter) of the second driving transistor T_pwm through the turned-on transistor T_spwm. Here, the PWM data voltage may be a higher voltage than the driving voltage VDD_PWM. Accordingly, in a state where the PWM data voltage is set to the A node, the second driving transistor T_pwm maintains a turned-off state.

Also, when the control signal SCCG(n) is applied to the transistor T_scc, a constant current generator data voltage (CCG data) applied from the data driver 510 is set to the gate terminal (referred to as a C node hereinafter) of the first driving transistor T_cc through the turned-on transistor T_scc. Here, the constant current generator data voltage may be a lower voltage than the driving voltage VDD_CCG. Accordingly, in a state where the constant current generator data voltage is set to the C node, the first driving transistor T_cc maintains a turned-on state.

Afterwards, when the control signal SET(n) is applied to the transistor T_set, Vset which is a low voltage is charged in the capacitor S_set through the turned-on transistor T_set, and the transistor T_sw is turned on.

When the first light emitting section for the nth row line starts, the control signals Emi(n) and Sweep(n) are applied to the sub-pixel circuit 110 together.

Specifically, when the control signal Emi(n) is applied to the transistor T_emi, a driving current flows to the inorganic light emitting element 20 through the turned-on first driving transistor T_cc, transistor T_sw, and transistor T_emi. Here, the magnitude of the driving current is determined by a difference value between the constant current generator data voltage and the driving voltage VDD_CCG set to the C node.

When the control signal Sweep(n), i.e., a sweep voltage that linearly decreases is applied to the capacitor C_sweep, the applied sweep voltage is coupled to the A node, and accordingly, the voltage of the A node gets to linearly decrease.

Accordingly, when the difference value between the voltage of the A node and the driving voltage VDD_PWM becomes the threshold voltage of the second driving transistor T_pwm, the second driving transistor T_pwm is turned on, and the driving voltage VDD_PWM is applied to the gate terminal of the transistor T_sw through the turned-on second driving transistor T_pwm.

Accordingly, the transistor T_sw is turned off, and the driving current may not flow in the inorganic light emitting element 20 anymore, and the inorganic light emitting element 20 may stop light emission. Here, the light emitting time of the inorganic light emitting element is determined by the magnitude of the PWM data voltage.

In the light emitting sections after the second light emitting section for the nth row line, the control signals SET(n), Emi(n), and Sweep(n) may be respectively applied, and the inorganic light emitting elements 20 may respectively emit light based on the image data voltage set in the data setting section.

In the above, only operations related to the nth row line were explained, but the operations regarding the remaining row lines may also be sufficiently understood through the aforementioned explanation.

According to an embodiment of the disclosure, the driver 500 may apply the same constant current generator voltage to all of the constant current generator circuits 112 of the display panel 100. Accordingly, a driving current of the same magnitude (i.e., a constant current) is provided to the inorganic light emitting elements 20 through the constant current generator circuits 112. Accordingly, the problem of change of the wavelength of the LED according to the change of the magnitude of the driving current can be resolved.

Also, the driver 500 may apply a PWM data voltage corresponding to the gray scale value of each sub-pixel to each PWM circuit 111 of the display panel 100. Accordingly, the driving time of the driving current (i.e., the constant current) provided to the inorganic light emitting element 20 of each sub-pixel may be controlled through the PWM circuit 111. Accordingly, a gray scale of an image can be represented.

The same constant current generator voltage is applied to one display panel 100, but it is obvious that different constant current generator voltages may be applied to different display panels 100. Accordingly, deviation in the brightness or deviation in colors among display panels that may occur in case one large-size display device is constituted as a plurality of display panels are connected may be compensated through adjustment of the constant current generator voltages.

Referring to FIG. 8B again, a sensing driving period may include a PWM circuit 112 sensing period (①) and a constant current generator circuit 111 sensing period (②).

During the PWM circuit 112 sensing period (①), a second current flowing in the second driving transistor T_pwm based on a second specific voltage applied from the data driver 510 is transmitted to the sensing unit 200.

During the constant current generator circuit 111 sensing period (②), a first current flowing in the first driving transistor T_cc based on a first specific voltage applied from the data driver 510 is transmitted to the sensing unit 200.

Accordingly, the sensing unit 200 may respectively output the first sensing data and the second sensing data based on the first and second currents.

Here, according to an embodiment of the disclosure, the sensing driving may be performed within a vertical blanking interval in one image frame time as illustrated in FIG. 8B. A vertical blanking interval refers to a time interval in which effective image data is not input into the display panel 100. Taking an image of 120 Hz for example, the display driving period may occupy a time of about 7.3 ms, and the blanking interval may occupy a time of about 1 ms within one image frame time, but the disclosure is not limited thereto.

Accordingly, the sensing unit 200 may sense currents flowing in the driving transistors T_cc, T_pwm based on a specific voltage applied during the blanking interval of one image frame, and output sensing data corresponding to the sensed currents.

However, embodiments are not limited thereto. For example, the sensing driving may be performed during a booting period, a power-off period, or a screen-off period, etc. of the display device 1000. Here, the booting period may mean a period after the system power is applied until the screen is turned on, the power-off period may mean a period after the screen is turned off until the system power is released, and the screen-off period may mean a period during which the system power is being applied, but the screen is turned off.

Referring to FIG. 8A and FIG. 8B, it can be known that separate driving voltages different from each other (i.e., the first driving voltage VDD_CCG and the second driving voltage VDD_PWM) are applied to the constant current generator circuit 111 and the PWM circuit 112.

If one driving voltage (e.g., VDD) is commonly used for the constant current generator circuit 111 and the PWM circuit 112, it may become a problem if the constant current generator circuit 111 using a driving voltage for applying a driving current to the inorganic light emitting element 20, and the PWM circuit 112 controlling only the pulse width of a driving current through on/off control of the second driving transistor T_pwm use the same driving voltage VDD.

Specifically, in the actual display panel 100, there are differences in resistance values among each area. Accordingly, when a driving current flows, differences occur in IR drop values among each area, and due to this, differences in the driving voltage VDD occur according to the location of the display panel 100.

Accordingly, in case the PWM circuit 112 and the constant current generator circuit 111 commonly use the driving voltage VDD in the circuit structure illustrated in FIG. 6, a problem that the operation time point of the PWM circuit 112 varies for each area for the same PWM data voltage occurs. This is for the reason that, as the driving voltage VDD is applied to the source terminal of the second driving transistor T_pwm, the on/off operations of the second driving transistor T_pwm are influenced by the change of the driving voltage VDD.

Such a problem can be resolved by respectively applying separate driving voltages to the constant current generator circuit 111 and the PWM circuit 112, as illustrated in FIG. 8A.

That is, when a driving current flows, even if the driving voltage VDD_CCG of the constant current generator circuit 111 varies for each area of the display panel 100 as described above, a driving current does not flow in the PWM circuit 112, and thus a separate driving voltage VDD_PWM having no difference for each area is applied, and accordingly, the aforementioned problem can be resolved.

Hereinafter, the operation of the display device 1000 in a sensing driving period will be described in more detail with reference to FIG. 8A and FIG. 8B.

Specifically, during the PWM circuit 112 sensing period (⓪), the second specific voltage is applied to the data signal line Vdata from the data driver 510. The second specific voltage may be any preset voltage for turning on the second driving transistor T_pwm. Here, the transistor T_spwm is turned on according to a control signal SPWM(n), and the second specific voltage is input into the A node through the turned-on transistor T_spwm.

During the PWM circuit 112 sensing period (①) the transistor T_psen is turned on according to a control signal PWM_Sen(n), and the second current flowing in the second driving transistor T_pwm is transmitted to the sensing unit 200 through the turned-on transistor T_psen.

During the PWM circuit 112 sensing period (①), the first switch 213 of the sensing unit 200 is turned on and off according to a control signal Spre. Hereinafter, explanation will be described by referring to the period during which the first switch 213 is turned on in the PWM circuit 112 sensing period (①) as a first initialization period, and the period during which the first switch 213 is turned off as a first sensing period.

During the first initialization period, the first switch 213 is in a turned-on state, and thus a reference voltage (Vpre) input into the non-inversion input terminal (+) of the amp 211 is maintained in the output terminal (Vout) of the amp 211.

During the first sensing period, the first switch 213 is turned off, and thus the amp 211 operates as a current integrator and integrates the second current. Here, by the second current introduced into the inversion input terminal (−) of the amp 211 during the first sensing period, the voltage difference at both ends of the integration capacitor 212 becomes bigger as the sensing time passes, i.e., as the accumulated charge amount increases.

Because of the virtual ground characteristic of the amp 211, the voltage of the inversion input terminal (−) is maintained as the reference voltage (Vpre) regardless of the increase of the voltage difference of the integration capacitor 212 in the first sensing period, and thus the voltage of the output terminal (Vout) of the amp 211 becomes lower correspondingly to the voltage difference at both ends of the integration capacitor 212.

According to such a principle, in the first sensing period, the second current introduced into the sensing unit 200 is accumulated as an integration value Vpsen which is a voltage value through the integration capacitor 212. As the gradient of the voltage drop of the output terminal (Vout) of the amp 211 increases as the second current is bigger, the size of the integration value Vpsen becomes smaller as the second current is bigger.

The integration value Vpsen is input into the ADC 220 while the second switch 214 is maintained in a turned-on state in the first sensing period, and it is converted into the second sensing data at the ADC 220, and is then output to the correction unit 300.

During the constant current generator circuit 111 sensing period (⓪), the first specific voltage is applied to the data signal line Vdata from the data driver 510. The first specific voltage is any preset voltage for turning on the first driving transistor T_cc. Here, the transistor T_scc is turned on according to a control signal SCCG(n), and the first specific voltage is input into the C node through the turned-on transistor T_scc.

During the constant current generator circuit 111 sensing period (②), the transistor T_csen is turned on according to a control signal CCG_Sen(n), and the first current flowing in the first driving transistor T_cc is transmitted to the sensing unit 200 through the turned-on transistor T_csen.

During the constant current generator circuit 111 sensing period (②), the first switch 213 of the sensing unit 200 is also turned on and off according to a control signal Spre. Hereinafter, explanation will be described by referring to the period during which the first switch 213 is turned on in the constant current generator circuit 111 sensing period (②) as a second initialization period, and the period during which the first switch 213 is turned off as a second sensing period.

During the second initialization period, the first switch 213 is in a turned-on state, and thus the reference voltage (Vpre) input into the non-inversion input terminal (+) of the amp 211 is maintained in the output terminal (Vout) of the amp 211.

During the second sensing period, the first switch 213 is turned off, and thus the amp 211 operates as a current integrator and integrates the first current. Here, by the first current introduced into the inversion input terminal (−) of the amp 211 during the second sensing period, the voltage difference at both ends of the integration capacitor 212 becomes bigger as the sensing time passes, i.e., as the accumulated charge amount increases.

Because of the virtual ground characteristic of the amp 211, the voltage of the inversion input terminal (−) is maintained as the reference voltage (Vpre) regardless of the increase of the voltage difference of the integration capacitor 212 in the second sensing period, and thus the voltage of the output terminal (Vout) of the amp 211 becomes lower correspondingly to the voltage difference at both ends of the integration capacitor 212.

According to such a principle, in the second sensing period, the first current introduced into the sensing unit 200 is accumulated as an integration value Vcsen which is a voltage value through the integration capacitor 212. As the gradient of the voltage drop of the output terminal (Vout) of the amp 211 increases as the first current is bigger, the size of the integration value Vcsen becomes smaller as the first current is bigger.

The integration value Vcsen is input into the ADC 220 while the second switch 214 is maintained in a turned-on state in the second sensing period, and it is converted into the first sensing data at the ADC 220, and is then output to the correction unit 300.

Accordingly, as described above, the correction unit 300 may respectively acquire the first and second compensation values based on the first and second sensing data, and store or update the acquired first and second compensation values in the memory. Afterwards, when the display driving is performed, the correction unit 300 may respectively correct the constant current generator data voltage and the PWM data voltage to be applied to the sub-pixel circuit 110 based on the first and second compensation values.

According to an embodiment of the disclosure, the first specific voltage and the second specific voltage may be applied to the pixel circuits corresponding to one row line per image frame. That is, according to an embodiment of the disclosure, the aforementioned sensing driving may be performed for one row line per image frame. Here, the aforementioned sensing driving may proceed in the order of the row lines.

Accordingly, for example, in case the display panel 100 consists of 270 row lines, the aforementioned sensing driving for the pixel circuits included in the first row line for the first image frame may be performed, and the aforementioned sensing driving for the pixel circuits included in the second row line for the second image frame may be performed.

In such a manner, sensing driving for the pixel circuits included in the 270th row line for the 270th image frame may be performed, and accordingly, sensing driving for the entire pixel circuits included in the display panel 100 may be completed once.

According to another embodiment of the disclosure, the first specific voltage and the second specific voltage may be applied to the pixel circuits corresponding to a plurality of row lines per image frame. That is, according to an embodiment of the disclosure, the aforementioned sensing driving may be performed for a plurality of row lines per image frame. Here, the aforementioned sensing driving may also proceed in the order of the row lines.

Accordingly, for example, if a case where the display panel 100 includes 270 row lines, and the aforementioned sensing driving is performed for three row lines per image frame is assumed, the aforementioned sensing driving for the pixel circuits included in the first to third row lines for the first image frame may be performed, and the aforementioned sensing driving for the pixel circuits included in the fourth to six row lines for the second image frame may be performed.

In such a manner, the aforementioned sensing driving for the pixel circuits included in the 268th to 270th row lines for the 90th image frame may be performed, and accordingly, sensing driving for the entire pixel circuits included in the display panel 100 may be completed once. Accordingly, in this case, when the driving for the 270th image frame is completed, the aforementioned sensing driving for the entire pixel circuits included in the display panel 100 may be completed three times.

In FIG. 8B, an example in which control signals related to image data voltage setting are applied in the order of SPWM(n) and SCCG(n) was suggested. However, the disclosure is not limited thereto, and depending on embodiments, it is obvious that the SCCG(n) signal can be applied first, and the SPWM(n) signal can be applied after that.

Also, in the above, an example in which sensing driving is performed in the order of the PWM circuit 112 sensing period (①) and the constant current generator circuit 111 sensing period (②) is suggested. However, the disclosure is not limited thereto, and depending on embodiments, it is obvious that the constant current generator circuit 111 sensing period (②) can proceed first, and the PWM circuit 112 sensing period (①) can proceed after the sensing period (②).

Further, in the above, an example in which sensing driving is performed after display driving was suggested. However, the disclosure is not limited thereto, and depending on embodiments, it is possible that sensing driving proceeds first, and display driving proceeds after the sensing driving.

Hereinafter, various embodiments of the disclosure will be described with reference to FIG. 9A to FIG. 13B. Here, each embodiment has a similar configuration and a similar operation principle to those described above through FIG. 8A and FIG. 8B, and thus overlapping explanation will be omitted, and description will be made focused on differences.

Figure 9A:
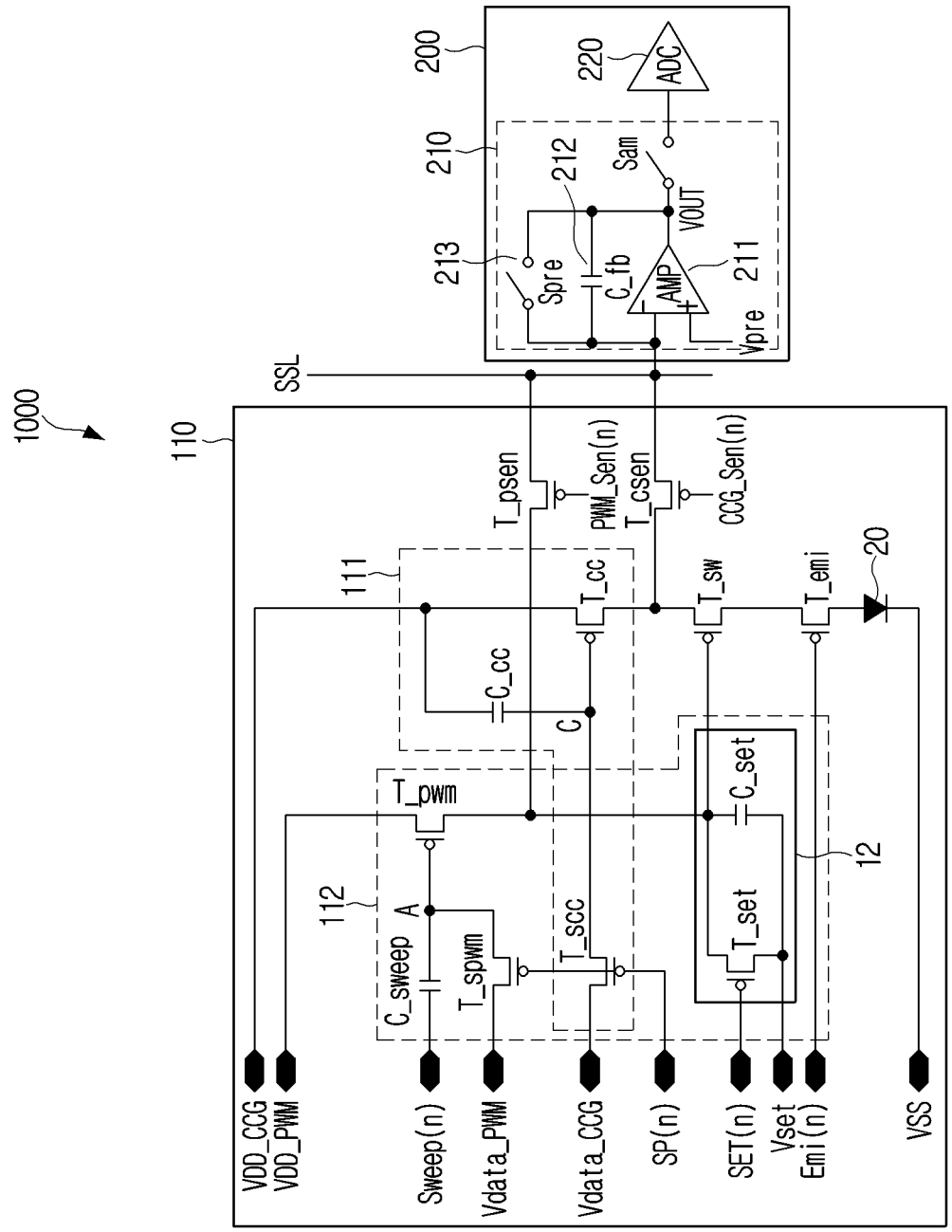
FIG. 9A is a detailed circuit diagram of a pixel circuit and a sensing unit according to another embodiment of the disclosure.
Figure 9B:
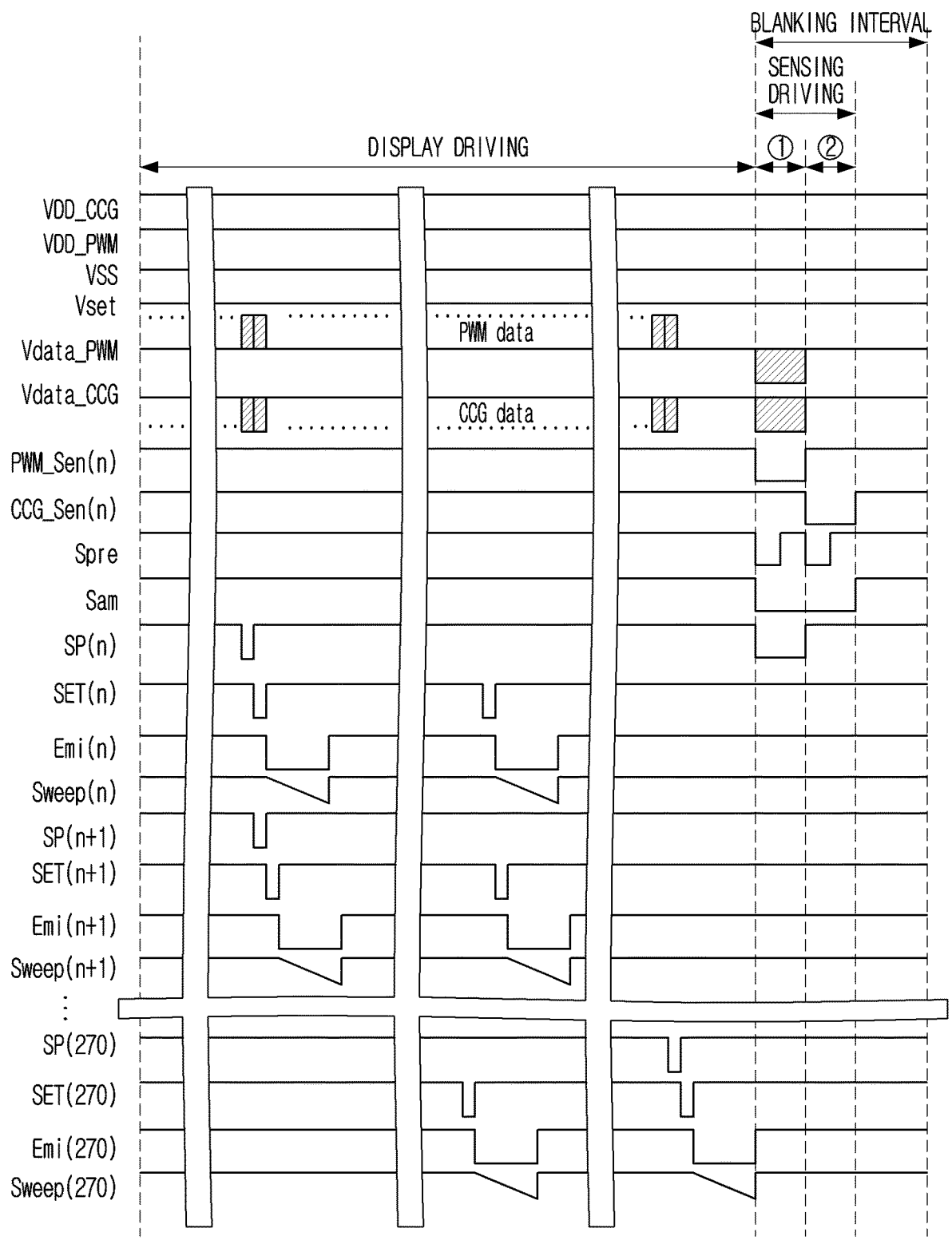
FIG. 9B is a driving timing diagram of a display device according to another embodiment of the disclosure.

FIG. 9A is a detailed circuit diagram of the sub-pixel circuit 110 and the sensing unit 200 according to another embodiment of the disclosure, and FIG. 9B is a driving timing diagram of the display device 1000 illustrated in FIG. 9A.

The sub-pixel circuit 110 illustrated in FIG. 9A is identical to the sub-pixel circuit 110 illustrated in FIG. 8A, except for the features that a PWM data voltage and a constant current generator data voltage are applied through separate data lines (Vdata_PWM, Vdata_CCG), and one control signal SP(n) is used for controlling the transistors T_spwm, T_scc.

As described above, for a PWM data voltage, a higher voltage than the driving voltage VDD_PWM is used, and for a constant current generator data voltage, a lower voltage than the driving voltage VDD_CCG is used.

Apart from the fact that the driving voltage VDD_CCG and the driving voltage VDD_PWM are separately applied to the sub-pixel circuit 110 through different lines, as for the magnitude, the same voltage may be used. In this case, the PWM data voltage becomes a relatively higher voltage than the constant current generator data voltage.

Here, in the case of the embodiments described above in FIG. 8A and FIG. 8B, the data driver 510 needs to alternatingly apply a relatively higher PWM data voltage and a relatively lower constant current generator data voltage to the sub-pixel circuit 110 through the data line (Vdata), and thus a heat generation phenomenon may occur.

Accordingly, as illustrated in FIG. 9A and FIG. 9B, occurrence of the aforementioned heat generation phenomenon can be prevented by respectively applying the PWM data voltage and the constant current generator data voltage by using separate drivers such as a first data driver for applying a PWM data voltage and a second data driver for applying a constant current generator data voltage. Here, each data voltage is respectively applied to the sub-pixel 110 through separate data lines (Vdata_PWM, Vdata_CCG).

In this case, as illustrated in FIG. 9B, the PWM data voltage and the constant current generator data voltage may be simultaneously applied to the sub-pixel circuit, and thus there is also an advantage that more light emitting sections can be secured compared to the driving method in FIG. 8B.

However, as the number of necessary data drivers increases, the embodiments in FIG. 8A and FIG. 8B will be advantageous in the aspect of the cost.

Figure 10A:
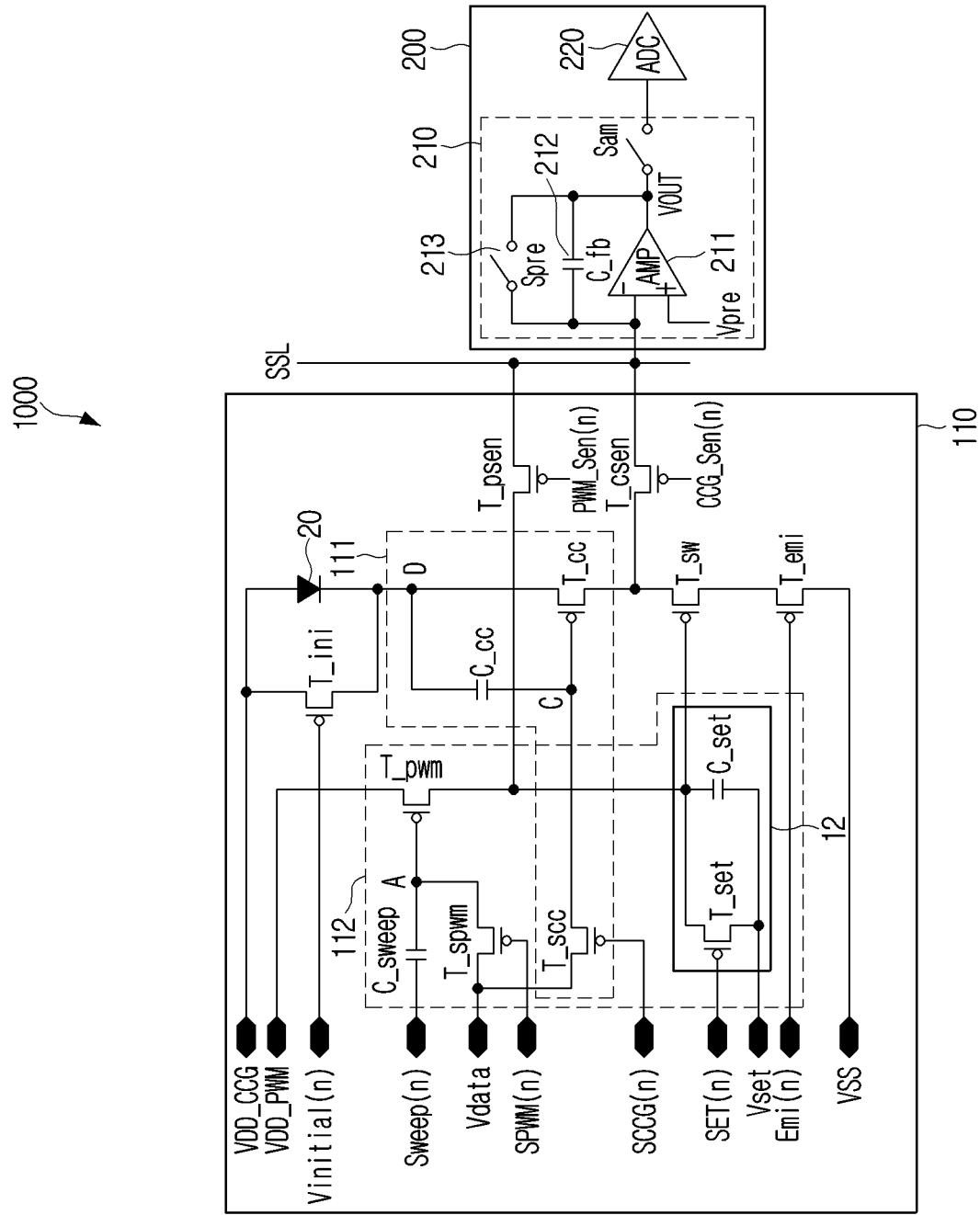
FIG. 10A is a detailed circuit diagram of a pixel circuit and a sensing unit according to still another embodiment of the disclosure.
Figure 10B:
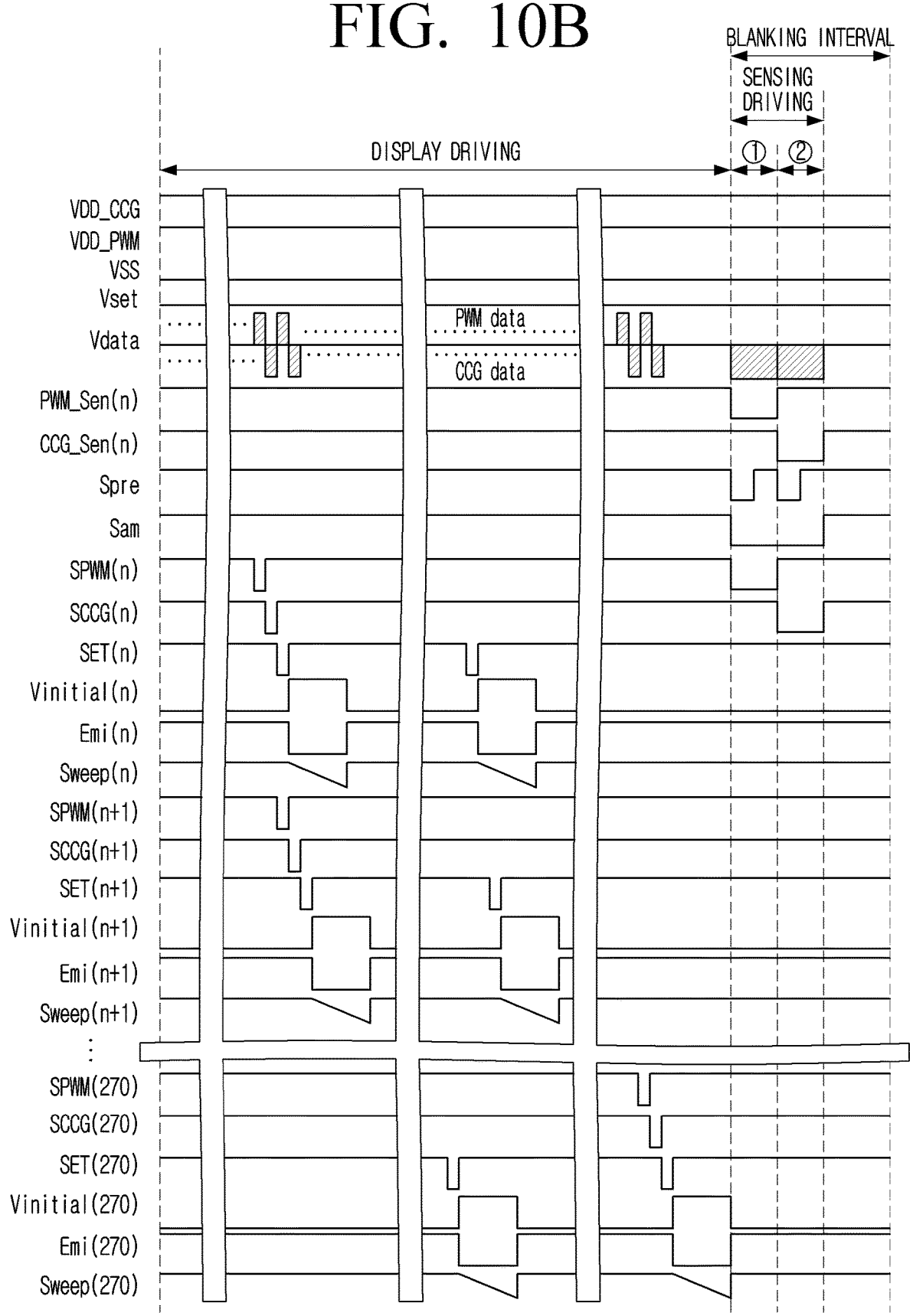
FIG. 10B is a driving timing diagram of a display device according to still another embodiment of the disclosure.

FIG. 10A is a detailed circuit diagram of the sub-pixel circuit 110 and the sensing unit 200 according to still another embodiment of the disclosure, and FIG. 10B is a driving timing diagram of the display device 1000 illustrated in FIG. 10A.

The sub-pixel circuit 110 illustrated in FIG. 10A is identical to that of FIG. 8A except for the feature that the inorganic light emitting element 20 moves to the side of the driving voltage terminal (VDD_CCG), and a transistor T_ini is connected to both ends of the inorganic light emitting element 20.

As in FIG. 8A, the structure in which the cathode terminal of the inorganic light emitting element 20 is connected to the ground terminal (VSS) which is a common electrode may be referred to as a common cathode connection structure, and as in FIG. 9A, the structure in which the anode terminal of the inorganic light emitting element 20 is connected to the driving voltage terminal (VDD_CCG) which is a common electrode may be referred to as a common anode connection structure.

In the case of the common anode connection structure, unlike the common cathode connection structure, even if a forward voltage (Vf) drop occurs when a driving current flows in the inorganic light emitting element 20, the C node voltage is compensated as much as the dropped voltage through the capacitor C_cc, and thus the voltage between the source and drain terminals of the first driving transistor T_cc is maintained regardless of the forward voltage drop.

Accordingly, there is an effect that the forward voltage deviation of the inorganic light emitting element 20 is compensated.

In a data setting section or a sensing driving period, the inorganic light emitting element 20 should not emit light, and in a light emitting section, a driving current should flow to the inorganic light emitting element 20, and accordingly, it can be seen that the transistor T_ini is turned off by a control signal Vinitial(n) only in a light emitting section, as illustrated in FIG. 9B.

Figure 11A:
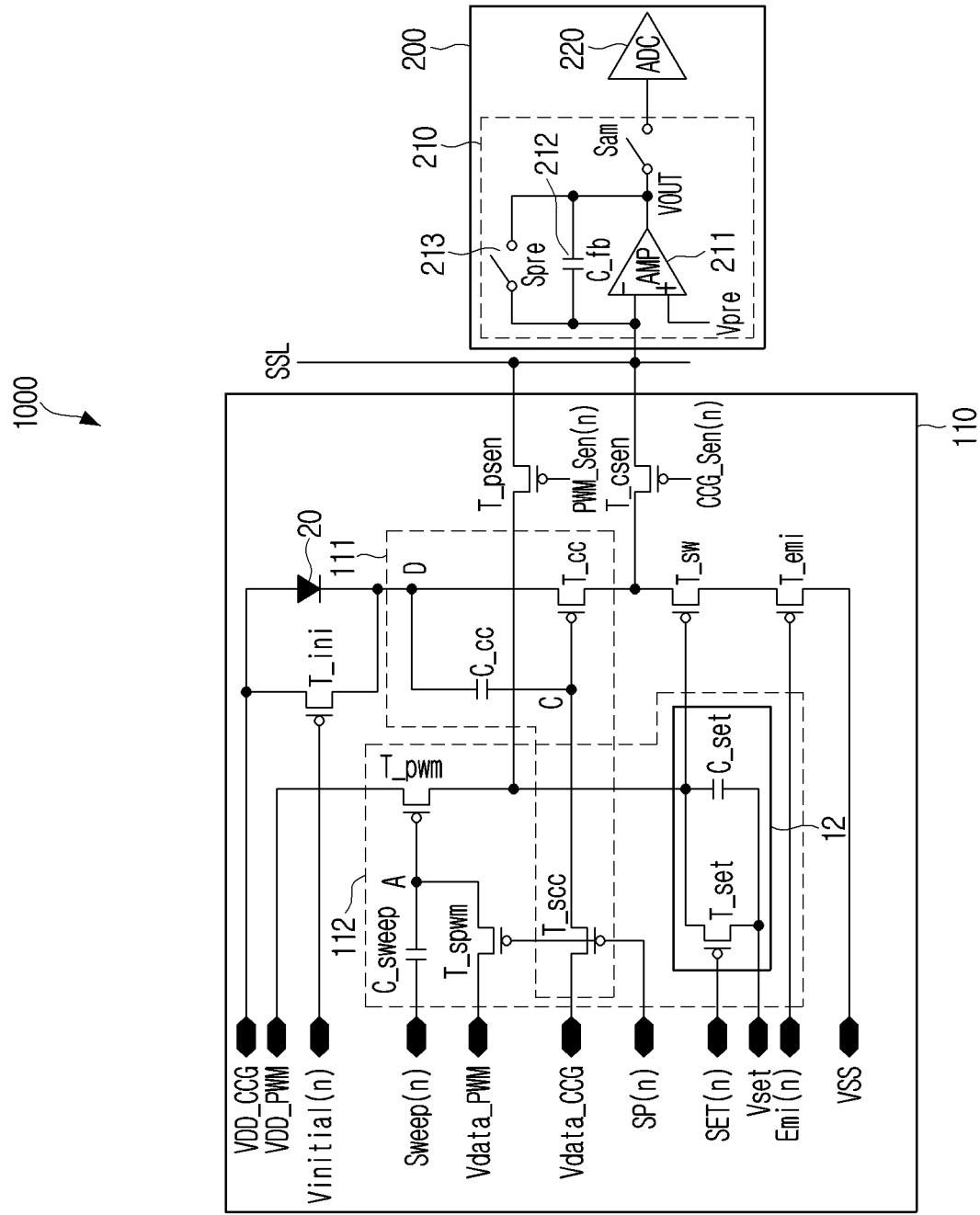
FIG. 11A is a detailed circuit diagram of a pixel circuit and a sensing unit according to still another embodiment of the disclosure.
Figure 11B:
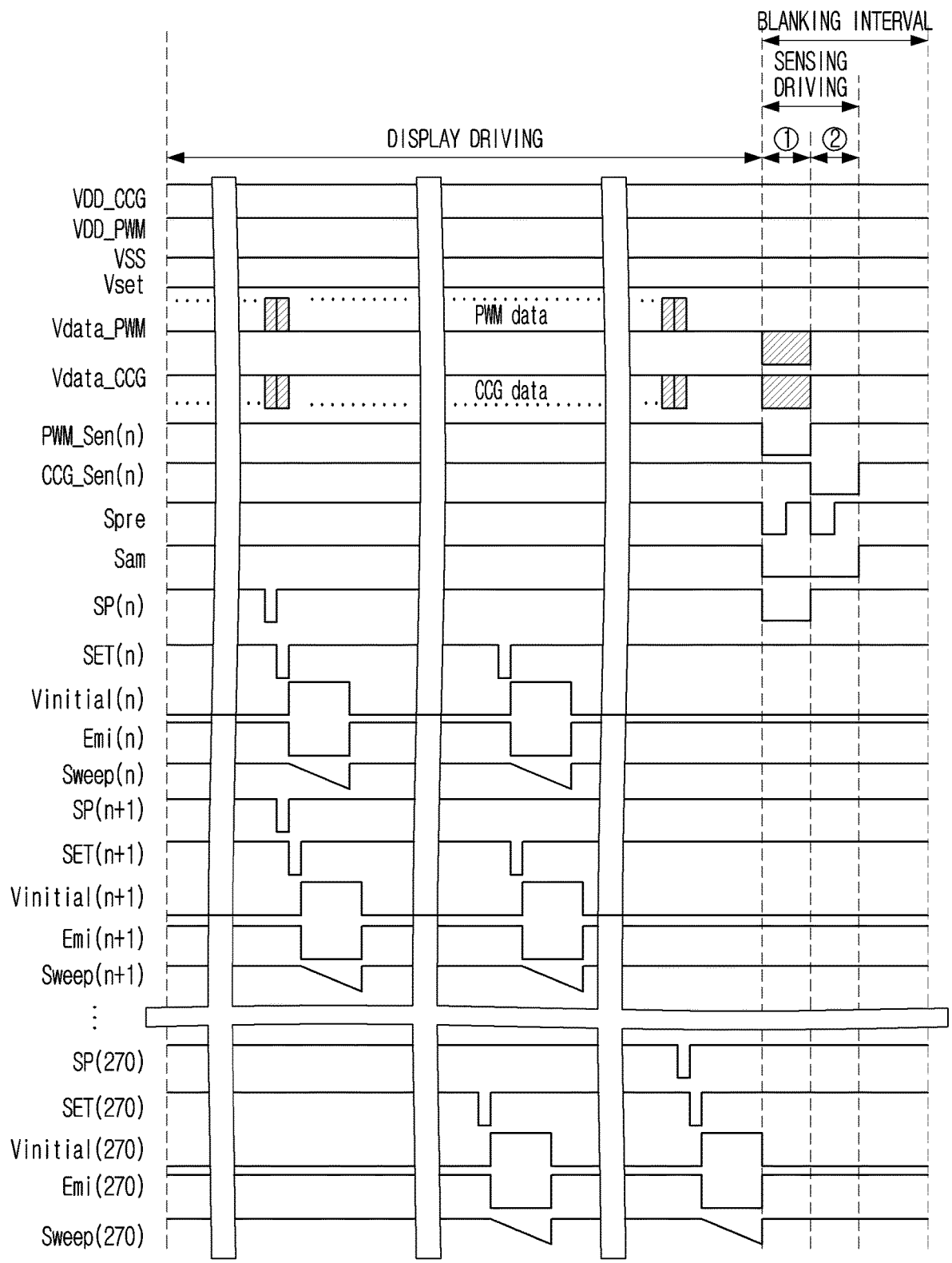
FIG. 11B is a driving timing diagram of a display device according to still another embodiment of the disclosure.

FIG. 11A and FIG. 11B are a circuit diagram and a timing diagram illustrating embodiments in which, in a common anode connection structure, a PWM data voltage and a constant current generator data voltage are applied through separate data lines (Vdata_PWM, Vdata_CCG).

The differences and advantages and disadvantages between the embodiments in FIG. 10A and FIG. 10B and the embodiments in FIG. 11A and FIG. 11B are as described above in FIG. 9A and FIG. 9B, and thus overlapping explanation will be omitted below.

Figure 12A:
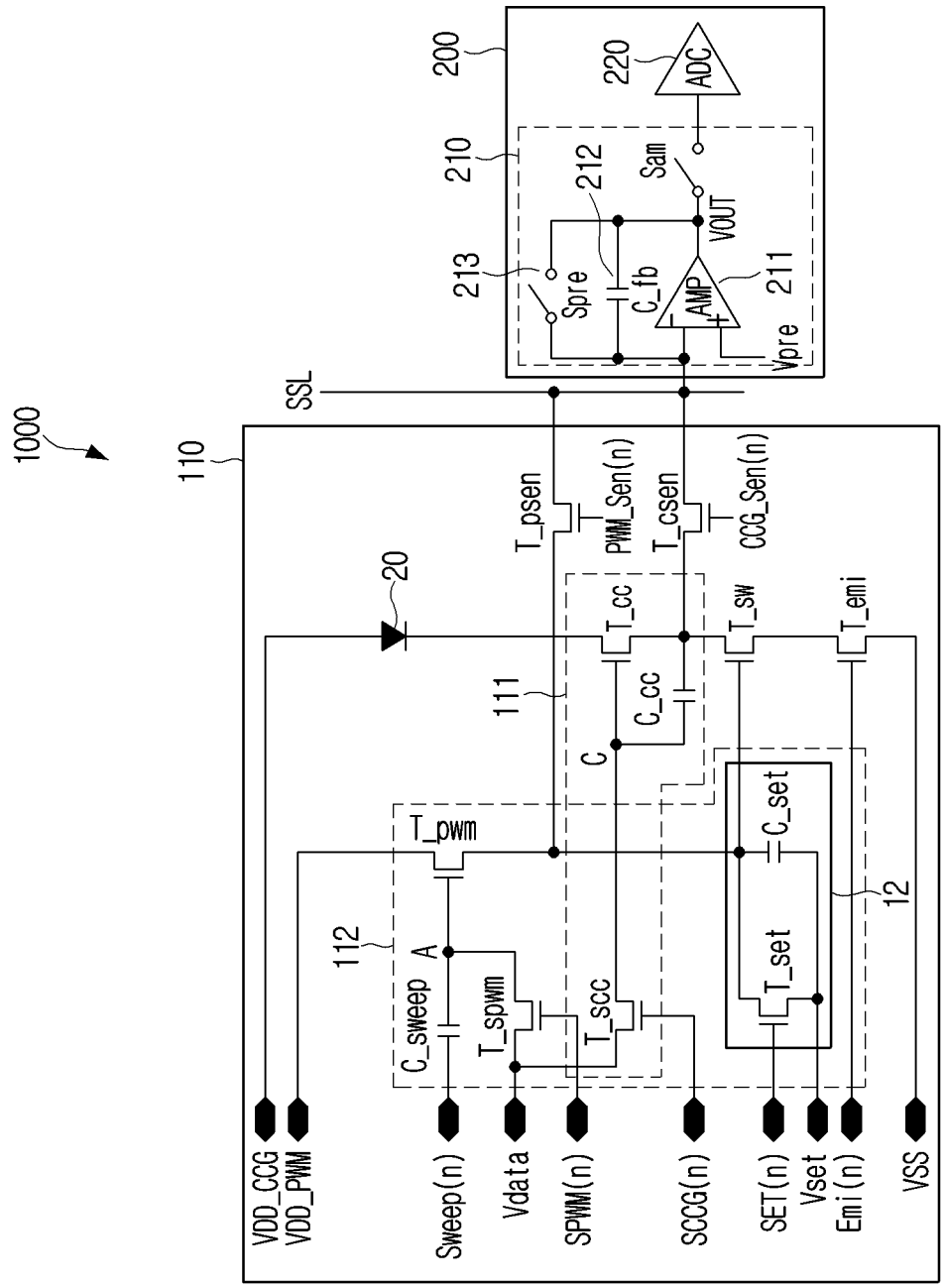
FIG. 12A is a detailed circuit diagram of a pixel circuit and a sensing unit according to still another embodiment of the disclosure.
Figure 12B:
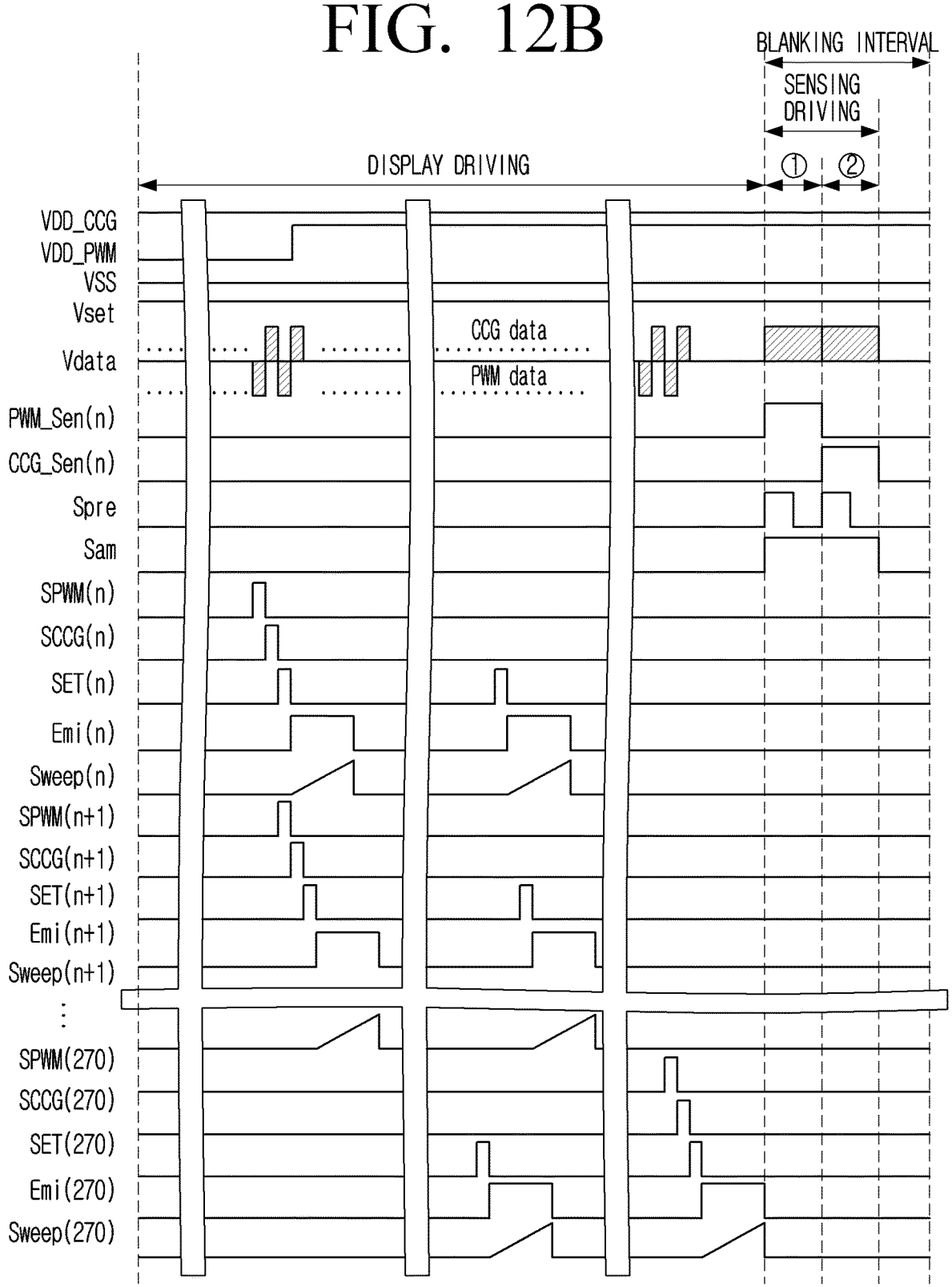
FIG. 12B is a driving timing diagram of a display device according to still another embodiment of the disclosure.

FIG. 12A and FIG. 12B are a circuit diagram and a driving timing diagram illustrating embodiments in which the transistors of the sub-pixel circuit 110 are implemented as NMOSFETs, unlike the aforementioned embodiments.

All of the TFTs illustrated in FIG. 12A are N-type oxide TFTs. Accordingly, it can be known that the structure of the sub-pixel circuit 110 in FIG. 12A is identical to the structure of the sub-pixel circuit illustrated in FIG. 8A, except for the feature that due to the difference in the type of the TFTs, the inorganic light emitting element 20 has a common anode structure, and the capacitor C_cc is arranged between the gate terminal and the source terminal of the first driving transistor T_cc.

Also, it can be known that the various kinds of driving signals illustrated in FIG. 12B are identical to those of FIG. 8B, except for the difference in the polarity of the signals due to the difference in the type of the TFTs.

Accordingly, through the aforementioned description about the PMOSFET, the circuit diagram illustrated in FIG. 12A and the timing diagram illustrated in FIG. 12B will be sufficiently understood.

In the case of an oxide TFT, it has a faster reaction speed than an a-si TFT, and thus it can implement a high resolution clearly. Also, as it has a fast reaction speed, integration is possible, and thus the bezel can be made to be thin. Also, as the manufacturing process is simple compared to an LTPS TFT, the cost can be reduced in constructing a production line. In addition, as it has higher uniformity that an LTPS, and does not need a separate crystallization process like an LTPS, there is a benefit that it is advantageous in manufacturing a large-size panel.

Figure 13A:
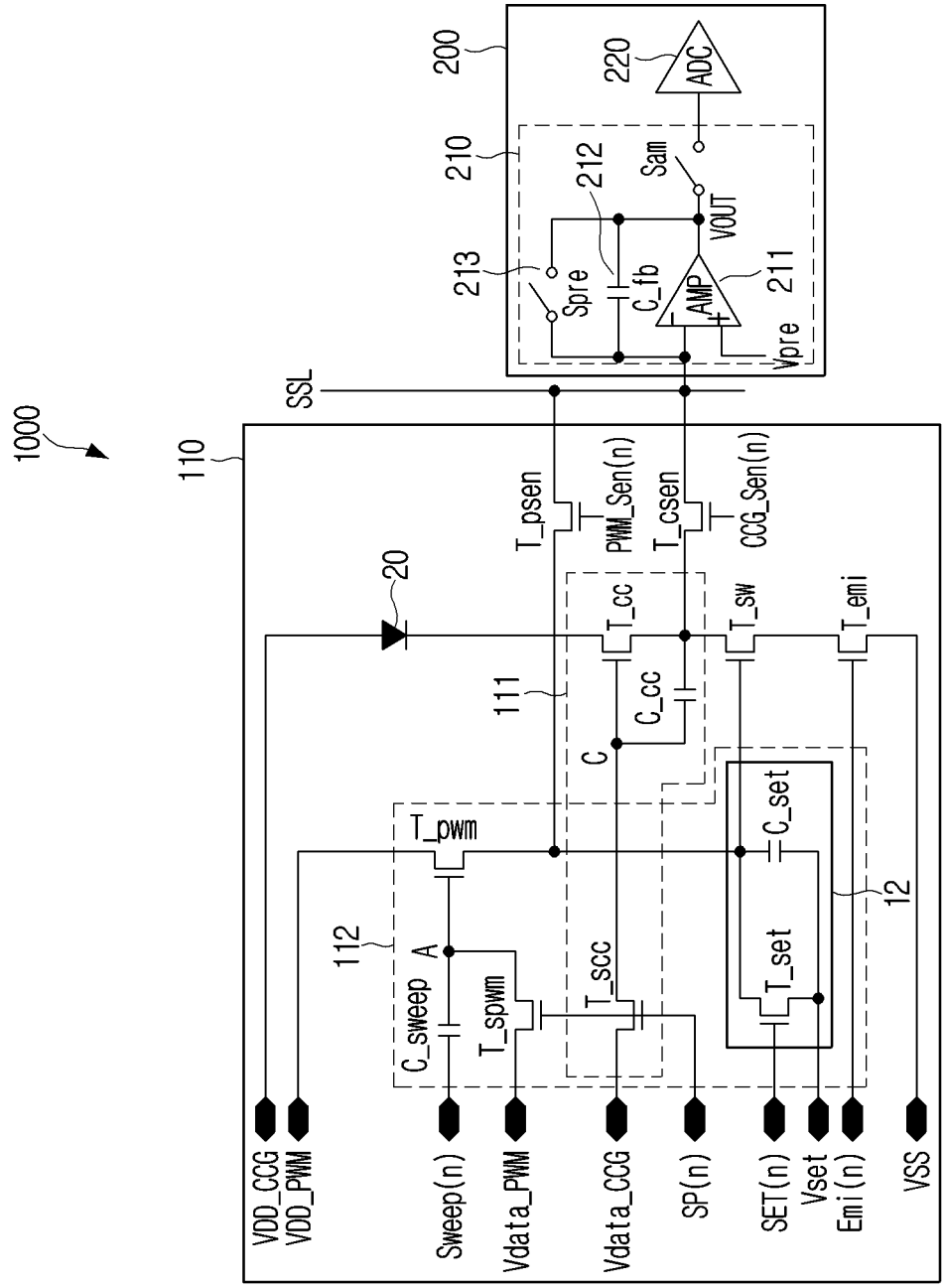
FIG. 13A is a detailed circuit diagram of a pixel circuit and a sensing unit according to still another embodiment of the disclosure.
Figure 13B:
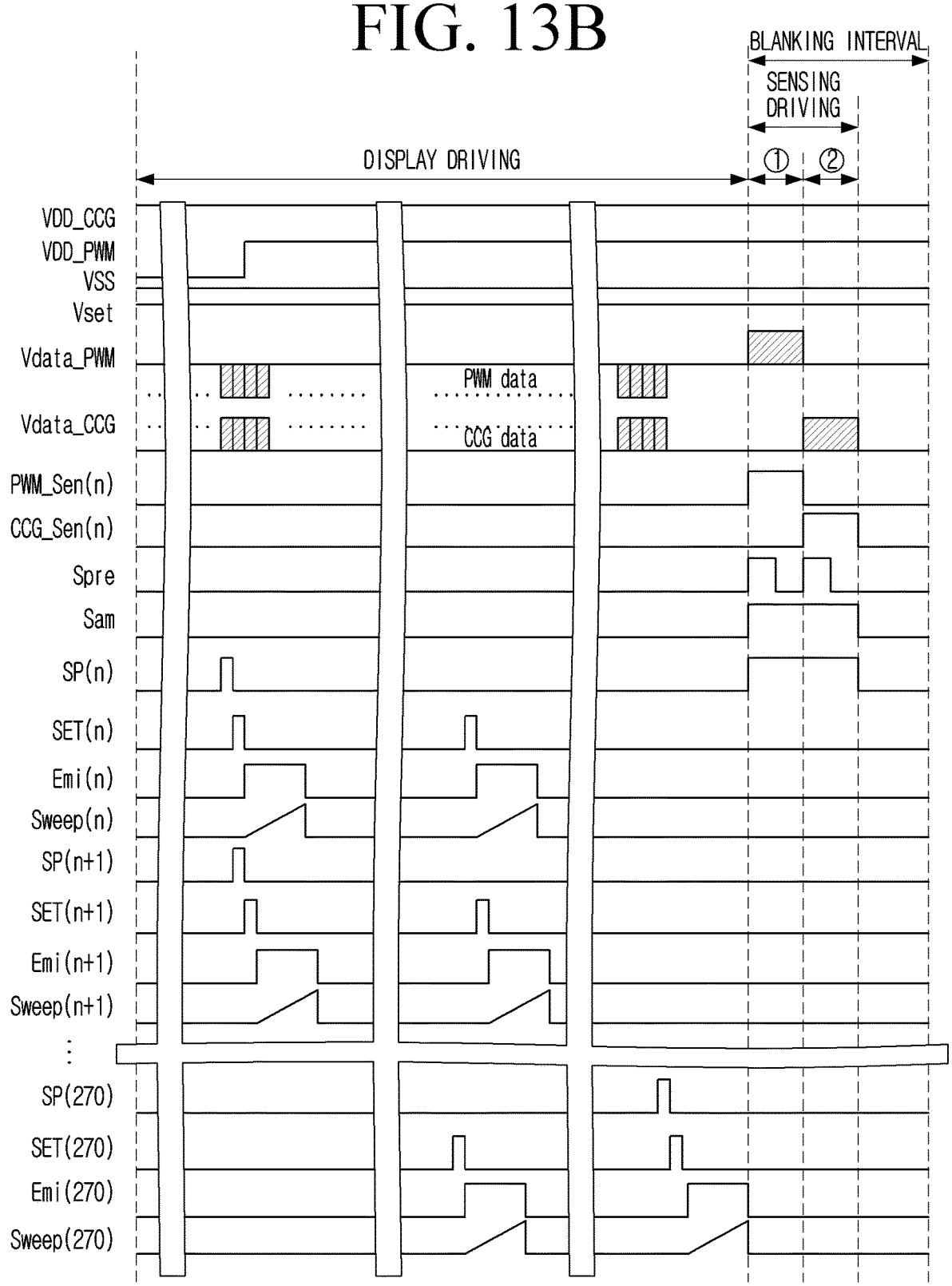
FIG. 13B is a driving timing diagram of a display device according to still another embodiment of the disclosure.

FIG. 13A and FIG. 13B are a circuit diagram and a timing diagram illustrating embodiments in which, in case the transistors of the sub-pixel circuit 110 are implemented as NMOSFETs, a PWM data voltage and a constant current generator data voltage are applied through separate data lines (Vdata_PWM, Vdata_CCG).

The differences and advantages and disadvantages between the embodiments in FIG. 12A and FIG. 12B and the embodiments in FIG. 13A and FIG. 13B are as described above in FIG. 9A and FIG. 9B, and thus overlapping explanation will be omitted below.

Figure 14A:
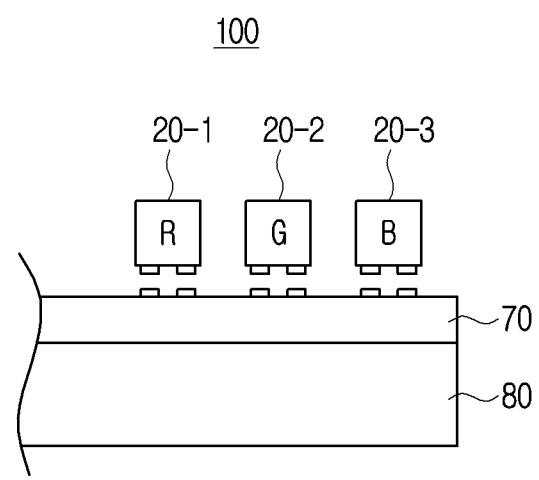
FIG. 14A is a cross-sectional view of a display panel according to an embodiment of the disclosure.

FIG. 14A is a cross-sectional view of the display panel 100 according to an embodiment of the disclosure. In FIG. 14A, only one pixel included in the display panel 100 is illustrated, for the convenience of explanation.

According to FIG. 14A, the display panel 100 includes a glass substrate 80, a TFT layer 70, and inorganic light emitting elements R, G, and B 20-1, 20-2, 20-3. Here, the aforementioned sub-pixel circuit 110 may be implemented as a thin film transistor (TFT), and included in the TFT layer 70 on the glass substrate 80.

Each of the inorganic light emitting elements R, G, and B 20-1, 20-2, 20-3 may be mounted on the TFT layer 70 so as to be electronically connected with the corresponding sub-pixel circuit 110, and constitute the aforementioned sub-pixel.

On the TFT layer 70, the sub-pixel circuit 110 providing a driving current to the inorganic light emitting elements 20-1, 20-2, 20-3 exists for each of the inorganic light emitting elements 20-1, 20-2, 20-3, and each of the inorganic light emitting elements 20-1, 20-2, 20-3 may be mounted or arranged on the TFT layer 70 so as to be electronically connected with the corresponding sub-pixel circuit 110.

FIG. 14A illustrates an example in which the inorganic light emitting elements R, G, and B 20-1, 20-2, and 20-3 are flip-chip type micro LEDs. However, the disclosure is not limited thereto, and depending on embodiments, the inorganic light emitting elements R, G, and B 20-1, 20-2, and 20-3 may be lateral type or vertical type micro LEDs.

Figure 14B:
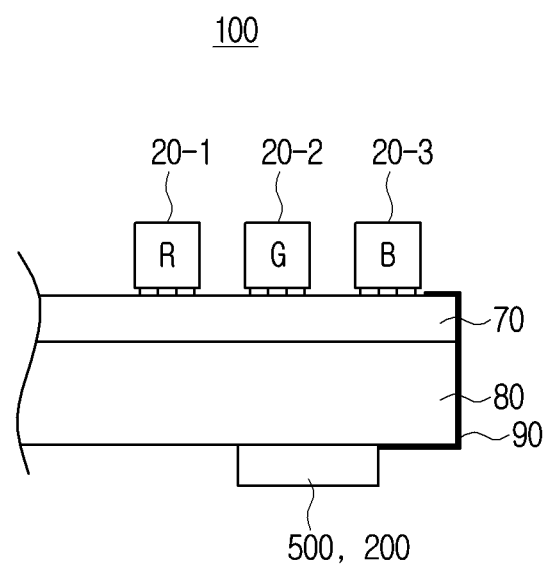
FIG. 14B is a cross-sectional view of a display panel according to another embodiment of the disclosure.

FIG. 14B is a cross-sectional view of the display panel 100 according to another embodiment of the disclosure.

According to FIG. 14B, the display panel 100 may include a TFT layer 70 formed on one surface of the glass substrate 80, inorganic light emitting elements R, G, and B 20-1, 20-2, and 20-3 mounted on the TFT layer 70, a driver and a sensing unit 500, 200, and a connection wiring 90 for electrically connecting sub-pixel circuits 110 formed on the TFT layer 70 and the driver and the sensing unit 500, 200.

As described above, according to an embodiment of the disclosure, at least some of the aforementioned various kinds of components that may be included in the driver 500 may be implemented in the form of a separate chip and arranged on the rear surface of the glass substrate 80, and may be connected to the sub-pixel circuits 110 formed on the TFT layer 70 through the connection wiring 90.

In this regard, referring to FIG. 14B, it can be known that the sub-pixel circuits 110 included in the TFT layer 70 are electrically connected to the driver 500 through the connection wiring 90 formed at the edge (or side) of the TFT panel (hereinafter, the TFT layer 70 and the glass substrate 80 in combination will be referred to as a TFT panel).

The reason why the sub-pixel circuits 110 included in the TFT layer 70 and the driver 500 are connected by forming a connection wiring 90 in the edge area of the display panel 100, as described above, is that a problem may occur in the sub-pixel circuits 110. For instance, cracks may occur in the glass substrate 80 due to the temperature difference between the process of manufacturing the TFT panels 70, 80 and the process of filling a hole with a conductive material, in case the sub-pixel circuits 110 and the driver 500 are connected by forming the hole penetrating the glass substrate 80.

In the above, an example in which the sub-pixel circuits 110 are implemented on the TFT layer 70 was described. However, embodiments are not limited thereto. That is, according to another embodiment of the disclosure, when implementing the sub-pixel circuits 110, it is possible to implement a pixel circuit chip in the form of a subminiature micro chip in sub-pixel units or pixel units, and mount the chip on the substrate 80, without using the TFT layer 70. Here, the location in which the sub-pixel chip is mounted may be, for example, the surroundings of the corresponding inorganic light emitting element 120, but is not limited thereto.

Also, in the aforementioned various embodiments of the disclosure, the TFTs constituting the TFT layer (or the TFT panel) are not limited to a specific structure or type. That is, the TFTs in the various embodiments of the disclosure may be implemented as a low temperature poly silicon (LTPS) TFT, an oxide TFT, a poly silicon or a-silicon TFT, an organic TFT, a graphene TFT, or the like, and may be applied only with a P-type (or N-type) MOSFET in an Si-wafer CMOS process.

In addition, in the above, the display panel 100 according to the various embodiments of the disclosure may be applied to wearable devices, portable devices, handheld devices, and various kinds of electronic products or electronic components which need displays in a single unit.

Further, the display panel 100 according to the various embodiments of the disclosure may also be applied to small-size display devices such as monitors for personal computers, TVs, etc., and large-size display devices such as digital signage, electronic displays, etc. through an assembly arrangement of a plurality of display panels 100.

According to the various embodiments of the disclosure as described above, a phenomenon in which the wavelength of light emitted from an inorganic light emitting element changes according to a gray scale can be prevented.

Also, a stain that might appear in an image due to differences in the threshold voltages and mobility between driving transistors, or a forward voltage deviation of inorganic light emitting elements can be easily compensated. In addition, color correction becomes easy.

Further, in a case of constituting a modular display panel by combining display panels in module forms, or in a case of constituting one display device with one display panel, stain compensation and color correction are possible more easily.

Also, design of a more optimized driving circuit becomes possible, and inorganic light emitting elements can be driven stably and effectively.

The descriptions above are merely illustrative of the technical idea of the disclosure, and a person having ordinary skill in the art to which the disclosure belongs will be able to perform various modifications and variations without departing from the essential characteristics of the disclosure. In addition, embodiments according to the disclosure are not for limiting the technical idea of the disclosure but for explaining the technical idea, and the scope of the technical idea of the disclosure is not limited by the embodiments. Accordingly, the scope of the disclosure should be construed by the appended claims, and all technical ideas in an equivalent range to the scope of the disclosure should be construed as being included within the scope of the disclosure.

What is claimed is:

1. A display device comprising:
    a display panel comprising a pixel array comprising a plurality of pixels and a plurality of sub-pixel circuits, wherein the plurality of pixels are arranged in a plurality of row lines, each pixel of the plurality of pixels comprises a plurality of inorganic light emitting elements, a sub-pixel circuit of the plurality of sub-pixel circuits is provided for each inorganic light emitting element of the plurality of inorganic light emitting elements and is configured to drive the inorganic light emitting element based on an image data voltage, and each sub-pixel circuit of the plurality of sub-pixel circuits comprises a driving transistor;
    a driver configured to set the image data voltage to sub-pixel circuits in each row line of the plurality of row lines in an order of the row lines, and drive sub-pixel circuits in at least two continued row lines among the plurality of row lines so that inorganic light emitting elements in the at least two continued row lines emit light in the order of the row lines based on the set image data voltage;
    a sensing unit configured to sense a current flowing in the driving transistor of each sub-pixel circuit of the plurality of sub-pixel circuits based on a specific voltage applied to the sub-pixel circuit of the plurality of sub-pixel circuits, and output sensing data corresponding to the sensed current; and
    a correction unit configured to correct the image data voltage applied to the sub-pixel circuit of the plurality of sub-pixel circuits based on the sensing data,
    wherein the driver is further configured to:
    set the image data voltage to the sub-pixel circuits in each row line of the plurality of row lines once during a data setting section for each row line of the plurality of row lines, and
    drive the sub-pixel circuits in each row line of the plurality of row lines so that inorganic light emitting elements in each row line of the plurality of row lines emit light based on the set image data voltage a number of times during a plurality of light emitting sections for each row line of the plurality of row lines.

2. The display device of claim 1, wherein the driver is further configured to:
    drive the sub-pixel circuits in each row line of the plurality of row lines so that the inorganic light emitting elements in the at least two continued row lines emit light based on the set image data voltage in the plurality of light emitting sections for each row line of the plurality of row lines.

3. The display device of claim 2, wherein a first light emitting section among the plurality of light emitting sections is temporally continuous with the data setting section, and each of the plurality of light emitting sections has a preset time interval.

4. The display device of claim 2, wherein the plurality of row lines are divided into a plurality of groups, each of the plurality of groups comprising a number of continued row lines,
    wherein the driver is further configured to:
    during a first image frame section, set a first image data voltage to the sub-pixel circuits in each row line of the plurality of row lines in the order of the row lines from a first row line to a last row line of the plurality of row lines, and
    during the first image frame section, drive the display panel so that inorganic light emitting elements in one group among the plurality of groups emit light in the order of the row lines, and then inorganic light emitting elements in each of at least two continued groups among the plurality of groups emit light in the order of the row lines based on the set first image data voltage, and
    wherein the at least two continued groups comprise the one group.

5. The display device of claim 4, wherein the driver is further configured to:
    during a second image frame section before the first image frame section, set a second image data voltage to the sub-pixel circuits in each row line of the plurality of row lines from the first row line to the last row line of the plurality of row lines in the order of the row lines, and during the first image frame section, drive the display panel so that inorganic light emitting elements in each of remaining groups of the plurality of groups excluding at least one group driven based on the first image data voltage emit light in the order of the row lines based on the second image data voltage.

6. The display device of claim 5, wherein the driver is further configured to:

during the first image frame section, drive the display panel so that inorganic light emitting elements in each row line of each of the plurality of groups emit light a plurality of times based on at least one of the first image data voltage or the second image data voltage in the plurality of light emitting sections for each row line of the plurality of row lines.

7. The display device of claim 2, wherein the image data voltage comprises a constant current generator data voltage and a pulse width modulation (PWM) data voltage, and wherein each of the plurality of sub-pixel circuits comprises:

a constant current generator circuit comprising a first driving transistor and configured to control a size of a driving current provided to the inorganic light emitting element based on the constant current generator data voltage; and a PWM circuit comprising a second driving transistor and configured to control a driving time of the driving current based on the PWM data voltage.

8. The display device of claim 7, wherein each of the plurality of sub-pixel circuits further comprises a first transistor, wherein a gate terminal of the first transistor is connected with the second driving transistor, and a source terminal or a drain terminal of the first transistor is connected with the first driving transistor, and wherein the constant current generator circuit is further configured to:

based on the first transistor being turned on, provide the driving current having a size corresponding to the constant current generator data voltage flowing through the first driving transistor to the inorganic light emitting element, and wherein the PWM circuit is further configured to:

based on the PWM data voltage being set to a gate terminal of the second driving transistor, turn off the first transistor based on the second driving transistor being turned on as a voltage of the gate terminal of the second driving transistor changes according to a sweep voltage.

9. The display device of claim 8, wherein the PWM circuit further comprises a reset unit configured to turn on the first transistor before a start of each light emitting section.

10. The display device of claim 8, wherein the first driving transistor, the second driving transistor, and the first transistor are PMOSFETs, wherein the gate terminal of the first transistor is connected to a drain terminal of the second driving transistor, and the source terminal of the first transistor is connected to a drain terminal of the first driving transistor, and wherein an anode terminal of the inorganic light emitting element is connected to the drain terminal of the first transistor, and a cathode terminal of the first transistor is connected to a ground voltage terminal.

11. The display device of claim 8, wherein the first driving transistor, the second driving transistor, and the first transistor are PMOSFETs, wherein the gate terminal of the first transistor is connected to a drain terminal of the second driving transistor, and the source terminal of the first transistor is connected to a drain terminal of the first driving transistor, wherein an anode terminal of the inorganic light emitting element is connected to a driving voltage terminal, and a cathode terminal of the inorganic light emitting element is connected to the source terminal of the first driving transistor, and wherein each of the plurality of sub-pixel circuits further comprises:

a second transistor that is connected to the inorganic light emitting element in parallel, and is turned on during the data setting section and is turned off in each of the plurality of light emitting sections.

12. The display device of claim 8, wherein the first driving transistor, the second driving transistor, and the first transistor are NMOSFETs, wherein the gate terminal of the first transistor is connected to a source terminal of the second driving transistor, and the drain terminal of the first transistor is connected to a source terminal of the first driving transistor, and wherein an anode terminal of the inorganic light emitting element is connected to a driving voltage terminal, and a cathode terminal of the inorganic light emitting element is connected to a drain terminal of the first driving transistor.

13. The display device of claim 7, wherein the constant current generator data voltage and the pulse width modulation (PWM) data voltage are applied to the constant current generator circuit and the PWM circuit, respectively, through separate data lines.

14. The display device of claim 7, wherein the specific voltage comprises a first specific voltage applied to the constant current generator circuit and a second specific voltage applied to the PWM circuit, and wherein the sensing unit is further configured to:

sense a first current flowing in the first driving transistor based on the first specific voltage, and output first sensing data corresponding to the sensed first current, and sense a second current flowing in the second driving transistor based on the second specific voltage, and output second sensing data corresponding to the sensed second current.

15. The display device of claim 14, wherein each of the plurality of sub-pixel circuits further comprises:

a third transistor configured to transmit the first current to the sensing unit; and a fourth transistor configured to transmit the second current to the sensing unit, and wherein each of the plurality of sub-pixel circuits is configured to:

provide the first current to the sensing unit through the third transistor while the first specific voltage is applied to the constant current generator circuit, and provide the second current to the sensing unit through the fourth transistor while the second specific voltage is applied to the PWM circuit.

16. The display device of claim 14, wherein the correction unit is further configured to:
  correct the constant current generator data voltage based on the first sensing data, and correct the PWM data voltage based on the second sensing data.

17. The display device of claim 16, wherein the correction unit is further configured to:
  obtain a first compensation value for correcting the constant current generator data voltage and a second compensation value for correcting the PWM data voltage based on a look-up table including sensing data values, and
  correct the constant current generator data voltage and the PWM data voltage based on the obtained first compensation value and the obtained second compensation value, respectively.

18. The display device of claim 1, wherein the driver is further configured to drive the sub-pixel circuits in each row line of the plurality of row lines so that the inorganic light emitting elements in each row line of the plurality of row lines emit light based on the set image data voltage during each of the plurality of light emitting sections.

19. The display device of claim 1, wherein the driver is further configured to:
  drive sub-pixel circuits in a first row line of the plurality of row lines so that inorganic light emitting elements in the first row line emit light during a first light emitting section of the first row line among the plurality of light emitting sections,
  drive sub-pixel circuits in a second row line of the plurality of row lines so that inorganic light emitting elements in the second row line emit light during a first light emitting section of the second row line among the plurality of light emitting sections after the first light emitting section of the first row line starts and before the first light emitting section of the first row line is completed, and
  drive sub-pixel circuits in a third row line of the plurality of row lines so that inorganic light emitting elements in the third row line emit light during a first light emitting section of the third row line among the plurality of light emitting sections after the first light emitting section of the second row line starts and before the first light emitting section of the second row line are completed.

* * * * *